(12) United States Patent
Tang et al.

(10) Patent No.: US 7,911,711 B1
(45) Date of Patent: Mar. 22, 2011

(54) PHOTOGRAPHING OPTICAL LENS ASSEMBLY

(75) Inventors: Hsiang Chi Tang, Taichung (TW); Tsung Han Tsai, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 0 days.

(21) Appl. No.: 12/850,267

(22) Filed: Aug. 4, 2010

(30) Foreign Application Priority Data

Apr. 23, 2010 (TW) ................ 99112822 A

(51) Int. Cl.
*G02B 9/60* (2006.01)
*G02B 3/02* (2006.01)
*G02B 9/00* (2006.01)

(52) U.S. Cl. ......... 359/764; 359/715; 359/739; 359/740

(58) Field of Classification Search .................. 359/715, 359/739, 740, 763, 764, 766

See application file for complete search history.

(56) References Cited

U.S. PATENT DOCUMENTS

| 7,365,920 | B2 | 4/2008 | Noda | |
|---|---|---|---|---|
| 7,643,225 | B1 | 1/2010 | Tsai | |
| 2010/0315723 | A1* | 12/2010 | Noda | ............ 359/714 |

* cited by examiner

*Primary Examiner* — Jack Dinh
(74) *Attorney, Agent, or Firm* — Tim Tingkang Xia; Morris, Manning & Martin, LLP

(57) ABSTRACT

This invention provides a photographing optical lens assembly including, in order from an object side toward an image side: a first lens element with positive refractive power having a convex object-side surface, a second lens element with negative refractive power having a concave object-side surface and a concave image-side surface, a third lens element with positive refractive power, a fourth lens element with negative refractive power having a convex object-side surface and a concave image-side surface, and at least one of surfaces thereof being aspheric, a plastic fifth lens element having a convex object-side surface and a concave image-side surface with at least one inflection point. An aperture stop is positioned between an imaged object and the third lens element. The photographing optical lens assembly further comprises an electronic sensor on which the object is imaged.

25 Claims, 25 Drawing Sheets

| TABLE 1 | | | | | | |
|---|---|---|---|---|---|---|
| (Embodiment 1) | | | | | | |
| f = 3.90 mm, Fno = 2.80, HFOV = 36.0 deg. | | | | | | |
| Surface # | | Curvature Radius | Thickness | Material | Index | Abbe # | Focal length |
| 0 | Object | Plano | Infinity | | | | |
| 1 | Ape. Stop | Plano | 0.086 | | | | |
| 2 | Lens 1 | 2.73087 (ASP) | 0.590 | Plastic | 1.544 | 55.9 | 3.41 |
| 3 | | -5.35770 (ASP) | 0.303 | | | | |
| 4 | Lens 2 | -5.22590 (ASP) | 0.553 | Plastic | 1.632 | 23.4 | -6.66 |
| 5 | | 22.57840 (ASP) | 0.655 | | | | |
| 6 | Lens 3 | -1.70391 (ASP) | 0.558 | Plastic | 1.530 | 55.8 | 4.39 |
| 7 | | -1.09563 (ASP) | 0.050 | | | | |
| 8 | Lens 4 | 1.75067 (ASP) | 0.300 | Plastic | 1.632 | 23.4 | -6.50 |
| 9 | | 1.14621 (ASP) | 0.264 | | | | |
| 10 | Lens 5 | 1.08327 (ASP) | 0.410 | Plastic | 1.544 | 55.9 | 79.50 |
| 11 | | 0.96290 (ASP) | 1.000 | | | | |
| 12 | IR-filter | Plano | 0.300 | Glass | 1.517 | 64.2 | - |
| 13 | | Plano | 0.268 | | | | |
| 14 | Image | Plano | | | | | |

Fig. 13

| TABLE 2A | | | | | |
|---|---|---|---|---|---|
| Aspheric Coefficients | | | | | |
| Surface # | 2 | 3 | 4 | 5 | 6 |
| k = | -4.80868E+00 | 2.55634E+01 | 6.94792E+00 | -4.66839E+02 | -3.83014E+00 |
| A4 = | -1.79187E-02 | -8.78897E-02 | -6.75767E-02 | 6.85399E-03 | -2.98426E-02 |
| A6 = | -4.62752E-02 | -4.32465E-02 | -2.46298E-02 | -1.05539E-02 | 2.27615E-02 |
| A8 = | -3.48528E-02 | -2.46839E-03 | 2.83775E-02 | 1.47548E-03 | -7.71543E-03 |
| A10= | -9.36339E-03 | 5.62820E-03 | 4.12878E-03 | 1.70369E-03 | -3.68634E-04 |
| A12= | -7.35290E-02 | -2.66971E-02 | 2.92387E-02 | 1.30568E-03 | -6.94455E-04 |
| A14= | 2.04477E-02 | 2.07908E-02 | -2.09021E-03 | -3.88145E-04 | 4.81790E-05 |
| A16= | -8.14408E-04 | -6.20871E-03 | -1.05738E-02 | -6.36822E-05 | 4.05774E-04 |
| Surface # | 7 | 8 | 9 | 11 | |
| k = | -1.62331E+00 | -8.64605E+00 | -6.44837E+00 | -4.57652E+00 | |
| A4 = | -6.47411E-03 | -8.73644E-03 | -9.96845E-03 | -2.93058E-02 | |
| A6 = | 5.36599E-03 | 6.59751E-04 | 6.36437E-05 | 2.29028E-03 | |
| A8 = | 2.84956E-03 | -2.17000E-04 | -7.55557E-05 | -1.50144E-04 | |
| A10= | 1.76519E-03 | 2.93109E-06 | 5.52277E-06 | -4.27927E-06 | |
| A12= | 3.04914E-04 | -8.47628E-08 | 9.53840E-07 | -6.97152E-07 | |
| A14= | -4.85701E-05 | -1.48321E-07 | 1.97010E-07 | | |

Fig. 14A

| TABLE 2B | |
|---|---|
| Aspheric Coefficients | |
| Surface # | 10 |
| k = | -6.02393E+00 |
| A1 = | |
| A2 = | |
| A3 = | |
| A4 = | -2.48247E-02 |
| A5 = | |
| A6 = | 4.56653E-04 |
| A7 = | |
| A8 = | 1.27013E-04 |
| A9 = | |
| A10 = | 9.41346E-06 |
| A11 = | |
| A12 = | 3.26829E-07 |

Fig. 14B

| TABLE 3 | | | | | | |
|---|---|---|---|---|---|---|
| (Embodiment 2) | | | | | | |
| f = 3.94 mm, Fno = 2.80, HFOV = 35.7 deg. | | | | | | |
| Surface # | | Curvature Radius | Thickness | Material | Index | Abbe # | Focal length |
| 0 | Object | Plano | Infinity | | | | |
| 1 | Ape. Stop | Plano | 0.108 | | | | |
| 2 | Lens 1 | 2.74591 (ASP) | 0.596 | Plastic | 1.544 | 55.9 | 3.39 |
| 3 | | -5.19040 (ASP) | 0.294 | | | | |
| 4 | Lens 2 | -5.19150 (ASP) | 0.562 | Plastic | 1.632 | 23.4 | -6.68 |
| 5 | | 23.50530 (ASP) | 0.679 | | | | |
| 6 | Lens 3 | -1.70020 (ASP) | 0.558 | Plastic | 1.530 | 55.8 | 4.04 |
| 7 | | -1.05506 (ASP) | 0.050 | | | | |
| 8 | Lens 4 | 1.90177 (ASP) | 0.300 | Plastic | 1.632 | 23.4 | -7.18 |
| 9 | | 1.25851 (ASP) | 0.278 | | | | |
| 10 | Lens 5 | 1.09721 (ASP) | 0.368 | Plastic | 1.544 | 55.9 | -24.77 |
| 11 | | 0.89469 (ASP) | 1.000 | | | | |
| 12 | IR-filter | Plano | 0.300 | Glass | 1.517 | 64.2 | - |
| 13 | | Plano | 0.266 | | | | |
| 14 | Image | Plano | | | | | |

Fig. 15

| TABLE 4A | | | | | |
|---|---|---|---|---|---|
| Aspheric Coefficients | | | | | |
| Surface # | 2 | 3 | 4 | 5 | 6 |
| k = | -4.63850E+00 | 2.50000E+01 | 6.02253E+00 | -4.38924E+02 | -3.62906E+00 |
| A4 = | -1.81235E-02 | -8.58286E-02 | -6.70457E-02 | 5.55146E-03 | -2.90736E-02 |
| A6 = | -4.96333E-02 | -4.11584E-02 | -2.41024E-02 | -1.09989E-02 | 2.30698E-02 |
| A8 = | -3.14242E-02 | 3.10736E-04 | 3.00762E-02 | 1.62097E-03 | -7.77091E-03 |
| A10= | 1.42208E-03 | 9.04475E-03 | 4.09089E-03 | 2.03981E-03 | -3.56766E-04 |
| A12= | -7.25799E-02 | -2.75697E-02 | 2.81889E-02 | 1.30945E-03 | -6.69033E-04 |
| A14= | -2.14829E-03 | 1.95463E-02 | -4.10204E-03 | -4.25722E-04 | 1.52098E-04 |
| A16= | -8.14448E-04 | -6.58761E-03 | -1.07174E-02 | -4.23312E-05 | 5.21359E-04 |
| Surface # | 7 | 8 | 9 | 11 | |
| k = | -1.70867E+00 | -8.91486E+00 | -6.77026E+00 | -4.69268E+00 | |
| A4 = | -6.08620E-03 | -9.14434E-03 | -9.85163E-03 | -3.04551E-02 | |
| A6 = | 5.33387E-03 | 8.28484E-04 | 6.11057E-05 | 2.65802E-03 | |
| A8 = | 3.10856E-03 | -2.39332E-04 | -7.20653E-05 | -1.93441E-04 | |
| A10= | 1.87827E-03 | -2.03059E-06 | 6.14432E-06 | -5.06975E-06 | |
| A12= | 3.25763E-04 | -8.54072E-08 | 9.77298E-07 | -6.53889E-07 | |
| A14= | -5.05501E-05 | 3.27138E-08 | 1.88396E-07 | | |

Fig. 16A

| TABLE 4B | |
|---|---|
| Aspheric Coefficients | |
| Surface # | 10 |
| k = | -6.68839E+00 |
| A1 = | |
| A2 = | |
| A3 = | |
| A4 = | -2.50070E-02 |
| A5 = | |
| A6 = | 4.62662E-04 |
| A7 = | |
| A8 = | 1.31559E-04 |
| A9 = | |
| A10 = | 9.87566E-06 |
| A11 = | |
| A12 = | 3.40181E-07 |

Fig. 16B

| TABLE 5 | | | | | | |
|---|---|---|---|---|---|---|
| (Embodiment 3) | | | | | | |
| f = 4.23 mm, Fno = 2.78, HFOV = 33.8 deg. | | | | | | |
| Surface # | | Curvature Radius | Thickness | Material | Index | Abbe # | Focal length |
| 0 | Object | Plano | Infinity | | | | |
| 1 | Lens 1 | 1.90924 (ASP) | 0.572 | Plastic | 1.544 | 55.9 | 3.17 |
| 2 | | -15.72880 (ASP) | -0.030 | | | | |
| 3 | Ape. Stop | Plano | 0.185 | | | | |
| 4 | Lens 2 | -16.12900 (ASP) | 0.339 | Plastic | 1.632 | 23.4 | -5.89 |
| 5 | | 4.88110 (ASP) | 0.986 | | | | |
| 6 | Lens 3 | -1.67899 (ASP) | 0.575 | Plastic | 1.530 | 55.8 | 4.85 |
| 7 | | -1.13608 (ASP) | 0.050 | | | | |
| 8 | Lens 4 | 3.29980 (ASP) | 0.359 | Plastic | 1.583 | 32.0 | -7.46 |
| 9 | | 1.80130 (ASP) | 0.339 | | | | |
| 10 | Lens 5 | 1.36372 (ASP) | 0.448 | Plastic | 1.544 | 55.9 | -69.03 |
| 11 | | 1.16360 (ASP) | 1.000 | | | | |
| 12 | IR-filter | Plano | 0.300 | Glass | 1.517 | 64.2 | - |
| 13 | | Plano | 0.178 | | | | |
| 14 | Image | Plano | | | | | |

Fig. 17

| TABLE 6A | | | | | |
|---|---|---|---|---|---|
| Aspheric Coefficients | | | | | |
| Surface # | 1 | 2 | 4 | 5 | 6 |
| k = | -1.27045E+00 | -2.86755E+02 | -1.02732E+03 | 1.00000E+00 | -1.14371E-01 |
| A4 = | 8.91801E-03 | -4.22147E-02 | -6.28821E-03 | 6.24569E-02 | -7.62771E-02 |
| A6 = | -1.03869E-03 | 3.80589E-03 | 2.07047E-02 | -6.12225E-03 | 4.17984E-02 |
| A8 = | -3.46984E-02 | -8.59094E-02 | -6.32000E-02 | -4.99888E-03 | -2.49615E-04 |
| A10= | 6.84788E-03 | -2.29194E-01 | -1.46805E-01 | -5.04173E-03 | 5.67091E-04 |
| A12= | -2.82812E-02 | 5.23209E-01 | 3.36754E-01 | -3.92131E-03 | -6.58113E-04 |
| A14= | 3.16475E-02 | 2.96378E-01 | -2.75381E-02 | 3.94170E-02 | 6.12316E-05 |
| A16= | -3.86634E-02 | -9.57102E-01 | -1.97915E-01 | -2.05682E-02 | 1.59320E-04 |
| Surface # | 7 | 8 | 9 | 11 | |
| k = | -1.15852E+00 | -5.37839E+00 | -5.37645E+00 | -4.69814E+00 | |
| A4 = | -2.93068E-02 | -2.06379E-03 | -8.87642E-03 | -3.26079E-02 | |
| A6 = | 1.46384E-03 | -2.17458E-04 | 2.74539E-04 | 2.14854E-03 | |
| A8 = | 2.43327E-03 | -2.03053E-04 | -7.73869E-05 | -1.35749E-04 | |
| A10= | 2.58037E-03 | 2.30985E-05 | 1.71923E-06 | 8.72084E-06 | |
| A12= | 5.39290E-04 | 1.61700E-06 | 4.59114E-07 | -9.37283E-07 | |
| A14= | -8.49876E-05 | -5.26978E-07 | 1.83513E-07 | | |

Fig. 18A

| TABLE 6B | |
|---|---|
| Aspheric Coefficients | |
| Surface # | 10 |
| k = | -5.46083E+00 |
| A1 = | |
| A2 = | |
| A3 = | |
| A4 = | -2.80432E-02 |
| A5 = | |
| A6 = | 5.99111E-04 |
| A7 = | |
| A8 = | 1.55457E-04 |
| A9 = | |
| A10 = | 1.00508E-05 |
| A11 = | |
| A12 = | -2.42695E-07 |

Fig. 18B

| TABLE 7 | | | | | | |
|---|---|---|---|---|---|---|
| (Embodiment 4) | | | | | | |
| f = 4.06 mm, Fno = 2.80, HFOV = 35.0 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.050 | | | | |
| 2 | Lens 1 | 1.72644 (ASP) | 0.684 | Plastic | 1.544 | 55.9 | 2.48 |
| 3 | | -5.28450 (ASP) | 0.079 | | | | |
| 4 | Lens 2 | -12.50000 (ASP) | 0.300 | Plastic | 1.632 | 23.4 | -4.69 |
| 5 | | 3.92620 (ASP) | 0.635 | | | | |
| 6 | Lens 3 | -1.84488 (ASP) | 0.792 | Plastic | 1.530 | 55.8 | 3.99 |
| 7 | | -1.13149 (ASP) | 0.050 | | | | |
| 8 | Lens 4 | 5.63190 (ASP) | 0.381 | Plastic | 1.544 | 55.9 | -3.19 |
| 9 | | 1.29658 (ASP) | 0.324 | | | | |
| 10 | Lens 5 | 1.28839 (ASP) | 0.597 | Plastic | 1.544 | 55.9 | 19.40 |
| 11 | | 1.22784 (ASP) | 0.600 | | | | |
| 12 | IR-filter | Plano | 0.300 | Glass | 1.517 | 64.2 | - |
| 13 | | Plano | 0.257 | | | | |
| 14 | Image | Plano | | | | | |

Fig. 19

| TABLE 8 | | | | | |
|---|---|---|---|---|---|
| Aspheric Coefficients | | | | | |
| Surface # | 2 | 3 | 4 | 5 | 6 |
| k = | -1.56437E+00 | 2.07128E+01 | -4.37312E+02 | 1.00000E+00 | 1.09083E+00 |
| A4 = | 6.49713E-03 | -6.21396E-02 | 4.61703E-03 | 8.88347E-02 | -7.61461E-02 |
| A6 = | -1.47270E-02 | -4.70452E-02 | 6.81929E-03 | 3.50276E-02 | 2.38534E-03 |
| A8 = | -1.02121E-01 | -7.45711E-03 | 2.12686E-02 | 6.46114E-03 | 3.15978E-02 |
| A10= | 3.02473E-02 | 5.32636E-03 | 9.58802E-03 | 1.28632E-02 | 3.31099E-02 |
| A12= | 1.14157E-01 | -1.80700E-02 | 2.05366E-02 | 3.10184E-02 | -8.61574E-03 |
| A14= | -2.51705E-01 | 1.61220E-02 | -4.44860E-02 | 2.29854E-02 | -1.67485E-02 |
| A16= | 1.48134E-02 | -6.66947E-02 | -9.49906E-03 | -6.16168E-02 | 1.34050E-02 |
| Surface # | 7 | 8 | 9 | 10 | 11 |
| k = | -2.74036E+00 | -3.84234E+02 | -1.44607E+01 | -1.05742E+01 | -7.53672E+00 |
| A4 = | -7.15619E-02 | 1.29242E-02 | -3.29600E-03 | -3.68655E-02 | -2.31377E-02 |
| A6 = | -2.11212E-03 | -1.26470E-03 | -2.20896E-03 | 2.28421E-03 | -4.95482E-04 |
| A8 = | 1.22567E-02 | -2.95409E-04 | 3.81158E-04 | 2.45279E-04 | 1.65459E-05 |
| A10= | 7.08852E-03 | 6.12779E-05 | 4.19407E-06 | 1.23077E-05 | 4.31215E-05 |
| A12= | 9.08450E-04 | 6.75697E-06 | -4.88185E-06 | -3.61014E-06 | -2.55656E-06 |
| A14= | -1.91770E-03 | -2.85624E-06 | -2.61182E-07 | | |

Fig. 20

| TABLE 9 | | | | | | |
|---|---|---|---|---|---|---|
| (Embodiment 5) | | | | | | |
| f = 4.06 mm, Fno = 2.80, HFOV = 35.0 deg. | | | | | | |
| Surface # | | Curvature Radius | Thickness | Material | Index | Abbe # | Focal length |
| 0 | Object | Plano | Infinity | | | | |
| 1 | Ape. Stop | Plano | -0.150 | | | | |
| 2 | Lens 1 | 1.38817 (ASP) | 0.580 | Plastic | 1.544 | 55.9 | 2.32 |
| 3 | | -11.73240 (ASP) | 0.050 | | | | |
| 4 | Lens 2 | -12.50000 (ASP) | 0.300 | Plastic | 1.632 | 23.4 | -4.58 |
| 5 | | 3.80370 (ASP) | 0.602 | | | | |
| 6 | Lens 3 | -1.34121 (ASP) | 0.576 | Plastic | 1.530 | 55.8 | 7.21 |
| 7 | | -1.14025 (ASP) | 0.050 | | | | |
| 8 | Lens 4 | 3.53890 (ASP) | 0.320 | Plastic | 1.544 | 55.9 | -9.31 |
| 9 | | 2.01665 (ASP) | 0.661 | | | | |
| 10 | Lens 5 | 1.98450 (ASP) | 0.460 | Plastic | 1.544 | 55.9 | -7.79 |
| 11 | | 1.24119 (ASP) | 0.600 | | | | |
| 12 | IR-filter | Plano | 0.300 | Glass | 1.517 | 64.2 | - |
| 13 | | Plano | 0.103 | | | | |
| 14 | Image | Plano | | | | | |

Fig. 21

| TABLE 10 | | | | | |
|---|---|---|---|---|---|
| Aspheric Coefficients | | | | | |
| Surface # | 2 | 3 | 4 | 5 | 6 |
| k = | -9.50450E-01 | 3.02016E+01 | -4.59299E+02 | 9.35064E-01 | 8.17092E-01 |
| A4 = | 2.58703E-02 | -6.07922E-02 | 2.87365E-02 | 1.33504E-01 | -3.98937E-02 |
| A6 = | 4.73547E-03 | -8.44634E-02 | -2.19901E-03 | 7.72178E-02 | 1.24987E-01 |
| A8 = | -1.20048E-01 | -4.25330E-02 | 9.52885E-03 | 2.10563E-02 | -3.57995E-02 |
| A10= | -3.27292E-03 | -3.24070E-02 | 1.29804E-02 | 3.04794E-02 | 5.55825E-02 |
| A12= | 1.17436E-01 | -3.98024E-02 | -9.06957E-03 | 9.80919E-02 | 6.71868E-02 |
| A14= | -1.71966E-01 | 1.53125E-02 | -9.86215E-02 | 1.04691E-01 | 1.70181E-02 |
| A16= | -2.78310E-01 | -1.08927E-01 | 1.36140E-01 | -1.86440E-01 | -6.64013E-02 |
| Surface # | 7 | 8 | 9 | 10 | 11 |
| k = | -2.12376E+00 | -1.40258E+01 | -1.33056E+01 | -3.53181E+01 | -1.27864E+01 |
| A4 = | -4.37863E-02 | 3.94444E-03 | -5.82679E-03 | -4.98079E-02 | -2.73286E-02 |
| A6 = | 1.18021E-03 | -3.09021E-04 | 3.76818E-04 | 5.01723E-03 | -1.06079E-03 |
| A8 = | 2.36641E-02 | 1.42293E-05 | 2.74133E-04 | 4.75416E-04 | 2.87773E-05 |
| A10= | 1.43511E-02 | 3.00677E-05 | -1.52789E-06 | 1.16487E-05 | 5.42716E-05 |
| A12= | -4.93601E-04 | -8.81753E-07 | -4.19602E-06 | -1.07712E-05 | -2.23508E-06 |
| A14= | -6.26403E-03 | -1.92017E-06 | -7.97797E-07 | | |

Fig. 22

| TABLE 11 | | | | | | | |
|---|---|---|---|---|---|---|---|
| (Embodiment 6) | | | | | | | |
| f = 4.22 mm, Fno = 2.78, HFOV = 33.7 deg. | | | | | | | |
| Surface # | | Curvature Radius | Thickness | Material | Index | Abbe # | Focal length |
| 0 | Object | Plano | Infinity | | | | |
| 1 | Lens 1 | 1.54892 (ASP) | 0.618 | Plastic | 1.544 | 55.9 | 3.56 |
| 2 | | 6.66670 (ASP) | 0.098 | | | | |
| 3 | Ape. Stop | Plano | 0.133 | | | | |
| 4 | Lens 2 | -16.12900 (ASP) | 0.300 | Plastic | 1.632 | 23.4 | -5.46 |
| 5 | | 4.41810 (ASP) | 0.796 | | | | |
| 6 | Lens 3 | -4.16990 (ASP) | 0.737 | Plastic | 1.530 | 55.8 | 3.29 |
| 7 | | -1.30530 (ASP) | 0.050 | | | | |
| 8 | Lens 4 | 16.44130 (ASP) | 0.505 | Plastic | 1.544 | 55.9 | -4.28 |
| 9 | | 2.01816 (ASP) | 0.367 | | | | |
| 10 | Lens 5 | 1.15172 (ASP) | 0.446 | Plastic | 1.544 | 55.9 | 35.34 |
| 11 | | 1.05792 (ASP) | 0.900 | | | | |
| 12 | IR-filter | Plano | 0.300 | Glass | 1.517 | 64.2 | - |
| 13 | | Plano | 0.152 | | | | |
| 14 | Image | Plano | | | | | |

Fig. 23

| TABLE 12 | | | | | |
|---|---|---|---|---|---|
| Aspheric Coefficients | | | | | |
| Surface # | 1 | 2 | 4 | 5 | 6 |
| k = | -3.62870E-01 | 1.00000E+01 | -1.10906E+01 | -1.83500E+01 | -2.84020E-02 |
| A4 = | 3.38302E-02 | 2.41552E-02 | -2.73904E-02 | 5.11770E-02 | -7.92065E-02 |
| A6 = | 4.06840E-02 | 4.02672E-02 | -4.62141E-02 | -2.85298E-02 | 3.20389E-02 |
| A8 = | -9.52353E-03 | -2.32920E-02 | -7.29171E-02 | -2.34742E-03 | -5.77614E-03 |
| A10= | 1.68979E-02 | -3.33379E-01 | -8.67251E-02 | -9.71337E-03 | 4.76332E-04 |
| A12= | -1.14228E-02 | 5.68559E-01 | 1.35829E-01 | -2.28830E-02 | 1.28215E-04 |
| A14= | 6.09988E-02 | 2.95302E-01 | -2.76392E-02 | 5.83471E-02 | 5.62655E-05 |
| A16= | -4.04357E-02 | -9.57153E-01 | -1.97966E-01 | -1.06023E-02 | -2.26271E-04 |
| Surface # | 7 | 8 | 9 | 10 | 11 |
| k = | -1.45791E+00 | 1.57484E+01 | -9.49011E+00 | -3.78934E+00 | -3.54044E+00 |
| A4 = | -2.17596E-02 | 7.15540E-03 | -1.49719E-02 | -4.11051E-02 | -3.49923E-02 |
| A6 = | -3.34207E-03 | 4.26277E-04 | 5.73441E-04 | -7.47980E-05 | 1.63263E-03 |
| A8 = | -1.07301E-03 | -1.96549E-04 | -2.55739E-05 | 1.65162E-04 | -1.59270E-04 |
| A10= | 2.31961E-03 | 2.68252E-05 | 5.25192E-07 | 1.27586E-05 | 2.98210E-05 |
| A12= | 6.13065E-04 | 2.09259E-06 | -7.74139E-07 | -5.32428E-08 | 5.30477E-07 |
| A14= | -2.29409E-04 | -5.07075E-07 | -7.18720E-08 | | |

Fig. 24

| TABLE 13 | | | | | | |
|---|---|---|---|---|---|---|
| | Embodiment 1 | Embodiment 2 | Embodiment 3 | Embodiment 4 | Embodiment 5 | Embodiment 6 |
| f | 3.90 | 3.94 | 4.23 | 4.06 | 4.06 | 4.22 |
| Fno | 2.80 | 2.80 | 2.78 | 2.80 | 2.80 | 2.78 |
| HFOV | 36.0 | 35.7 | 33.8 | 35.0 | 35.0 | 33.7 |
| V1-V2 | 32.5 | 32.5 | 32.5 | 32.5 | 32.5 | 32.5 |
| V3-V4 | 32.4 | 32.4 | 23.8 | -0.1 | -0.1 | -0.1 |
| (CT2/f)*10 | 1.42 | 1.43 | 0.80 | 0.74 | 0.74 | 0.71 |
| R4/f | 5.79 | 5.97 | 1.15 | 0.97 | 0.94 | 1.05 |
| f/f1 | 1.14 | 1.16 | 1.33 | 1.64 | 1.75 | 1.19 |
| f/f5 | 0.05 | -0.16 | -0.06 | 0.21 | -0.52 | 0.12 |
| f1/f3 | 0.78 | 0.84 | 0.65 | 0.62 | 0.32 | 1.08 |
| (T12/f)*100 | 7.77 | 7.46 | 3.66 | 1.95 | 1.23 | 5.47 |
| SL/TTL | 1.02 | 1.02 | 0.90 | 0.99 | 0.97 | 0.86 |
| TTL/ImgH | 1.80 | 1.80 | 1.82 | 1.72 | 1.58 | 1.86 |

Fig. 25

PHOTOGRAPHING OPTICAL LENS ASSEMBLY

CROSS-REFERENCE TO RELATED APPLICATIONS

This non-provisional application claims priority under 35 U.S.C. §119(a) on Patent Application No(s). 099112822 filed in Taiwan, R.O.C. on Apr. 23, 2010, the entire contents of which are hereby incorporated by reference.

BACKGROUND OF THE INVENTION

1. Field of the Invention

The present invention relates to a photographing optical lens assembly, and more particularly, to a compact photographing optical lens assembly used in portable electronic devices.

2. Description of the Prior Art

In recent years, with the popularity of mobile phone cameras, the demand for compact imaging lenses is increasing, and the sensor of a general photographing camera is none other than CCD (charge coupled device) or CMOS device (Complementary Metal Oxide Semiconductor device). Furthermore, as advanced semiconductor manufacturing technology has allowed the pixel size of sensors to be reduced and the resolution of compact imaging lenses has gradually increased, there is an increasing demand for compact imaging lenses featuring better image quality.

A conventional compact photographing optical lens assembly for mobile electronics, such as the one disclosed in U.S. Pat. No. 7,365,920, generally comprises four lens elements, wherein two spherical-surface glass lenses are used as the first and second lens elements, and being adhered together to form a doublet and thereby to correct the chromatic aberration. Such an arrangement of optical elements, however, has the following disadvantages: (1) the freedom of the system is curtailed due to the employment of excess number of spherical-surface glass lenses, thus the total track length of the system cannot be reduced easily; (2) the process of making the glass lenses adhered together is complicated, posing difficulties in manufacture. In addition, a four independent lens elements optical system is disclosed by U.S. Pat. No. 7,643,225, comprising multiple aspheric lens elements, which effectively shortens the total track length and obtains high image quality.

However, due to the popularity of high standard mobile devices such as smart phones and PDAs (Personal Digital Assistant) driving the rapid improvements in high resolution and image quality of the compact imaging lens systems, conventional four lens elements systems no longer satisfy the higher level camera modules. Furthermore, with the current trend for high performance and compact design in electronic products, the need for high resolution and high performance compact photographing optical lens assembly is very crucial in high level electronics development.

Therefore, a need exists in the art for a photographing optical lens assembly that features better image quality, maintains a moderate total track length and is applicable to compact portable electronic products.

SUMMARY OF THE INVENTION

The present invention provides a photographing optical lens assembly comprising: in order from an object side to an image side: a first lens element with positive refractive power having a convex object-side surface; a second lens element with negative refractive power having a concave object-side surface and a concave image-side surface; a third lens element with positive refractive power; a fourth lens element with negative refractive power having a convex image-side surface and a concave image-side surface, at least one of the object-side and image-side surfaces thereof being aspheric; and a fifth lens element having a convex object-side surface and a concave image-side surface, at least one inflection point formed on the image-side surface, made of plastic; wherein the photographing optical lens assembly further comprises an aperture stop and an electronic sensor for image formation, wherein the aperture stop is disposed between the imaged object and the third lens element; wherein the first lens element of the photographing optical lens assembly is closest to the object, and there are at most six lens elements with refractive power in the photographing optical lens assembly; and wherein the radius of curvature on the image-side surface of the second lens element is R4, the focal length of the photographing optical lens assembly is f, the Abbe number of the first lens element is V1, the Abbe number of the second lens element is V2, the distance on the optical axis between the aperture stop and the electronic sensor is SL, the distance on the optical axis between the object-side surface of the first lens element and the electronic sensor is TTL, and they satisfy the relation:

$0.3 < R4/f < 30.0;$ $23.0 < V1-V2 < 45.0;$ $0.65 < SL/TTL < 1.10$

According to another aspect of the present invention, a photographing optical lens assembly comprises, in order from an object side to an image side: a first lens element with positive refractive power having a convex object-side surface; a second lens element with negative refractive power having a concave object-side surface and a concave image-side surface; a third lens element with positive refractive power having a concave object-side surface and a convex image-side surface; a fourth lens element with negative refractive power, at least one of the object-side and image-side surfaces thereof being aspheric; a fifth lens element having a convex object-side surface and a concave image-side surface, the object-side and image-side surfaces thereof being aspheric; wherein the photographing optical lens assembly further comprises an aperture stop and an electronic sensor for image formation, and the aperture stop is disposed between the imaged object and the third lens element; wherein there are five lens elements with refractive power in the photographing optical lens assembly; wherein the radius of curvature on the image-side surface of the second lens element is R4, the focal length of the photographing optical lens assembly is f, the distance on the optical axis between the first lens element and the second lens element is T12, the distance on the optical axis between the aperture stop and the electronic sensor is SL, the distance on the optical axis between the object-side surface of the first lens element and the electronic sensor is TTL, and they satisfy the relation:

$0.3 < R4/f < 30.0;$ $0.5 < (T12/f)*100 < 15.0;$ $0.65 < SL/TTL < 1.10$

Such an arrangement of optical elements can reduce the size as well as the sensitivity of the optical system and obtain higher resolution.

In the present photographing optical lens assembly, the first lens element has positive refractive power supplying a portion of total refractive power needed in the system, which reduces the total track length of the photographing optical lens assembly; the second lens element has negative refractive power so that the aberration generated from the positive refractive power of the first lens element and the chromatic aberration of the system can be favorably corrected; the third lens element has positive refractive power, which effectively distributes the refractive power of the first lens element and reduces the sensitivity of the system; the fourth lens element having negative refractive power along with the third lens element can form the one-positive-one-negative telephoto structure, which effectively reduces the total track length of the photographing optical lens assembly; the fifth lens element can have positive or negative refractive power, which functions as a corrective lens balancing and correcting all types of aberrations within the system; when the fifth lens element has positive refractive power, coma can be effectively corrected while preventing other aberrations from becoming too large; when the fifth lens element has negative refractive power, the principal point of the optical system can be further away from the image plane, favorably reducing the total track length of the system in order to maintain the compactness of the lens assembly.

In the present photographing optical lens assembly, the first lens element may be a bi-convex lens element or a meniscus lens element having a convex object-side surface and a concave image-side surface. When the first lens element is a bi-convex lens element, the refractive power thereof can be effectively enhanced, thus shortening the total track length of the photographing optical lens assembly. When the first lens element is a meniscus lens element, the astigmatism of the system can be corrected more favorably. The second lens element has a concave object-side surface and a concave image-side surface that effectively correct the Petzval Sum of the system, allowing the surrounding image plane to become more flat and to favorably extend the back focal length of the system, thereby providing sufficient space to accommodate other components. The third lens element may be a meniscus with a concave object-side surface and a convex image-side surface whereas the fourth and fifth lens elements are meniscus lens elements with a convex object-side surface and a concave image-side surface so as to correct the astigmatism and obtain high image quality in the system. Moreover, the third, fourth, and fifth lens elements are meniscus lens elements with more balanced refractive power that effectively reduces the system sensitivity.

In the aforementioned photographing optical lens assembly, the aperture stop can be disposed between the imaged object and the first lens element, the first lens element and the second lens element, or the second lens element and the third lens element. The first lens element provides positive refractive power, and the aperture stop is disposed near the object side of the photographing optical lens assembly, thereby the total track length of the photographing optical lens assembly can be reduced effectively. The aforementioned arrangement also enables the exit pupil of the photographing optical lens assembly to be positioned far away from the image plane, thus light will be projected onto the electronic sensor at a nearly perpendicular angle, and this is the telecentric feature of the image side. The telecentric feature is very important to the photosensitivity of the solid-state sensor as it can improve the photosensitivity of the sensor and reduce the probability of the shading occurrence. Moreover, the fifth lens element is provided with at least one inflection point, thereby the angle at which the light is projected onto the sensor from the off-axis field can be effectively reduced to further correct the off-axis aberrations. In addition, when the aperture stop is disposed closer to the third lens elements, a wide field of view can be favorably achieved. Such stop placement facilitates the correction of the distortion and chromatic aberration of magnification, and the mitigation of the system's sensitivity. Therefore, in the present photographing optical lens assembly, the aperture stop is placed between the imaged object and the third lens element for the purpose of achieving a balance between the telecentric feature and wide field of view of the photographing optical lens assembly; preferably, the aperture stop is disposed between the first lens element and the second lens element.

BRIEF DESCRIPTION OF THE DRAWINGS

FIG. 13 is TABLE 1 which lists the optical data of the first embodiment.

FIGS. 14A and 14B are TABLES 2A and 2B which list the aspheric surface data of the first embodiment.

FIG. 15 is TABLE 3 which lists the optical data of the second embodiment.

FIGS. 16A and 16B are TABLES 4A and 4B which list the aspheric surface data of the second embodiment.

FIG. 17 is TABLE 5 which lists the optical data of the third embodiment.

FIGS. 18A and 18B are TABLES 6A and 6B which list the aspheric surface data of the third embodiment.

FIG. 19 is TABLE 7 which lists the optical data of the fourth embodiment.

FIG. 20 is TABLE 8 which lists the aspheric surface data of the fourth embodiment.

FIG. 21 is TABLE 9 which lists the optical data of the fifth embodiment.

FIG. 22 is TABLE 10 which lists the aspheric surface data of the fifth embodiment.

FIG. 23 is TABLE 11 which lists the optical data of the sixth embodiment.

FIG. 24 is TABLE 12 which lists the aspheric surface data of the sixth embodiment.

FIG. 25 is TABLE 13 which lists the data of the respective embodiments resulting from the equations.

DETAILED DESCRIPTION OF THE PREFERRED EMBODIMENTS

Figure 1:
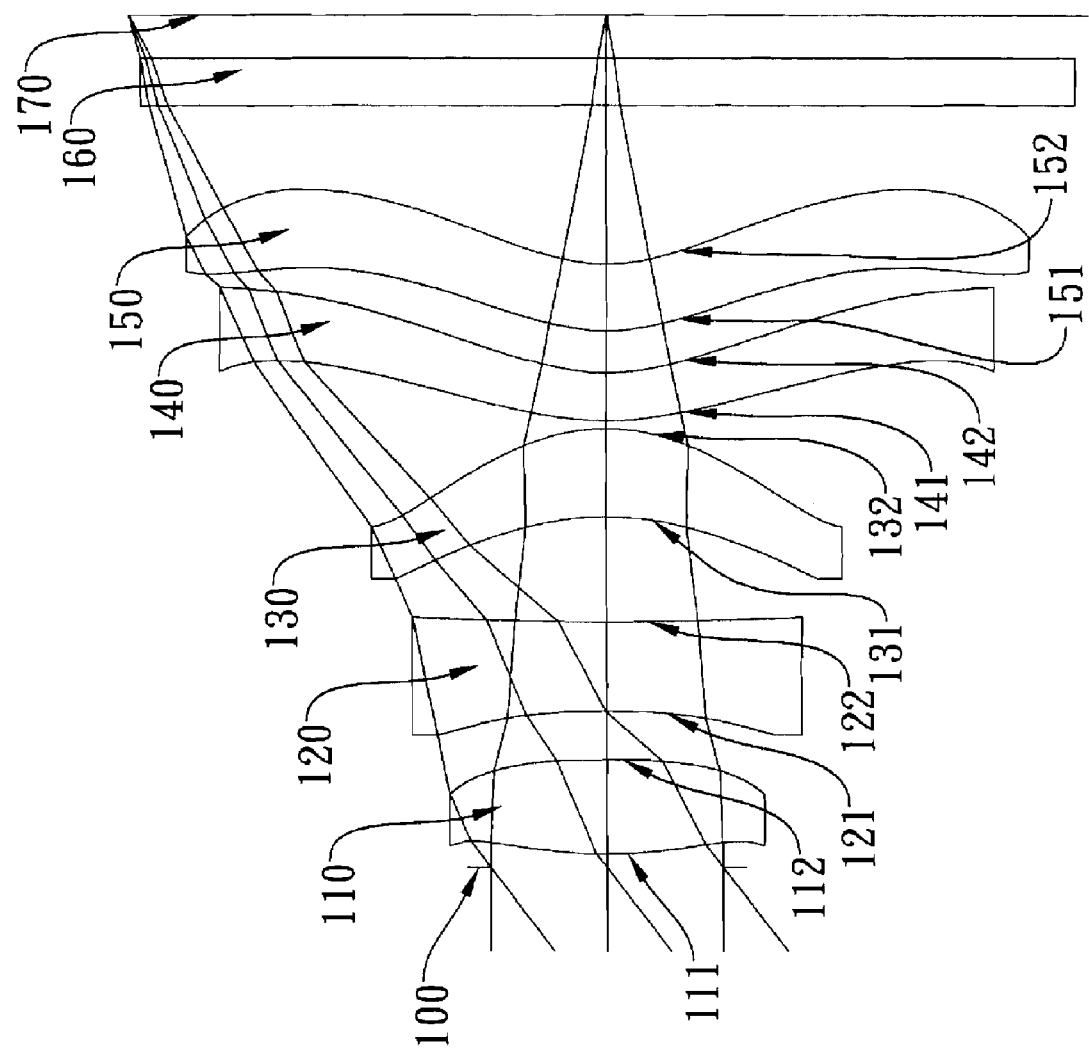
FIG. 1 shows a photographing optical lens assembly in accordance with a first embodiment of the present invention.

The present invention provides a photographing optical lens assembly comprising, in order from the object side to the image side: a first lens element with positive refractive power having a convex object-side surface; a second lens element with negative refractive power having a concave object-side surface and a concave image-side surface; a third lens element with positive refractive power; a fourth lens element with negative refractive power having a convex object-side surface and a concave image-side surface, at least one of the object-side and image-side surfaces thereof being aspheric; and a fifth lens element having a convex object-side surface and a concave image-side surface, at least one inflection point formed on the image-side surface, made of plastic; wherein the photographing optical lens assembly further comprises an aperture stop and an electronic sensor for image formation; wherein the aperture stop is disposed between the imaged object and the third lens element; wherein the lens element of the photographing optical lens assembly with refractive power closest to the object side is the first lens element, and there are at most six lens elements with refractive power; and wherein the radius of curvature on the image-side surface of the second lens element is R4, the focal length of the photographing optical lens assembly is f, the Abbe number of the first lens element is V1, the Abbe number of the second lens element is V2, the distance on the optical axis between the aperture stop and the electronic sensor is SL, the distance on the optical axis between the object-side surface of the first lens element and the electronic sensor is TTL, and they satisfy the relation:

$$0.3 < R4/f < 30.0;$$

$$23.0 < V1-V2 < 45.0;$$

$$0.65 < SL/TTL < 1.10$$

When the aforementioned photographing optical lens assembly satisfies the relation: 0.3<R4/f<30.0, the back focal distance can be effectively increased to allow placement of other components; preferably, they satisfy the relation: 0.6<R4/f<2.0. When the aforementioned photographing optical lens assembly satisfies the relation: 23.0<V1-V2<45.0, the chromatic aberration of the photographing optical lens assembly can be favorably corrected; preferably, they satisfy the relation: 31.0<V1-V2<42.0. When the aforementioned photographing optical lens assembly satisfies the relation: 0.65<SL/TTL<1.10, the photographing optical lens assembly can obtain a good balance between the telecentric feature and wide field of view; preferably, the aperture stop is disposed between the first lens element and the second lens element, and they satisfy the relation: 0.78<SL/TTL<0.93.

In the aforementioned photographing optical lens assembly, it is preferable that the third lens element has a concave object-side surface and a convex image-side surface so as to favorably correct the astigmatism of the system; preferably, the fifth lens element has negative refractive power, causing the principal point of the optical system to be away from the image plane which reduces the total track length of the optical system to maintain the compact size of the lens assembly; preferably, there are five lens elements with refractive power in the photographing lens assembly, and with suitable number of lens elements, the system can obtain higher image quality without having the total track length of the lens assembly being too long.

In the aforementioned photographing optical lens assembly, preferably, it satisfies the relation: 0.80<f/f1<2.00, wherein the focal length of the photographing optical lens assembly is f, the focal length of the first lens element is f1. When the above relation is satisfied, the refractive power of the first lens element is more balanced so that the total track length of the system can be effectively controlled to keep the photographing optical lens assembly compact while preventing the high order spherical aberration from becoming too large with improved image quality, preferably, they satisfy the relation: 1.32<f/f1<2.00.

In the aforementioned photographing optical lens assembly, preferably, it satisfies the relation: 0.25<f1/f3<1.20, wherein the focal length of the first lens element is f1, the focal length of the third lens element is f3. When the photographing optical lens assembly satisfies the above relation, the distribution of refractive power from the first lens element and the third lens element is more balanced, which reduces the sensitivity of the system and the generation of aberration.

In the aforementioned photographing optical lens assembly, preferably, it satisfies the relation: 0.3<(CT2/f)*10<1.1, wherein the thickness on the optical axis of the second lens element is CT2, the focal length of the photographing optical lens assembly is f. When the photographing optical lens assembly satisfies the above relation, the thickness of the second lens element is better suited for obtaining a good balance between the manufacturing yields and correcting the aberration of the system, and favorable for moldability and homogeneity of injection molding of plastic lenses.

In the aforementioned photographing optical lens assembly, preferably, it satisfies the relation: 0.5<(T12/f)*100<9.5, wherein the distance on the optical axis between the first and second lens elements is T12, the focal length of the photographing lens assembly is f. When the photographing lens assembly satisfies the above relation, the distance on the optical axis between the first and second lens elements is better for avoiding difficulties in lens assembly due to tight spacing or the distance from being too long where the lens assembly will no longer be compact; preferably, they satisfy the relation: 0.5<(T12/f)*100<5.5.

In the aforementioned photographing optical lens assembly, preferably, it satisfies the relation: −0.35<f/f5<0.35, wherein the focal length of the photographing optical lens assembly is f, the focal length of the fifth lens element is f5. When the photographing optical lens assembly satisfies the above relation, the fifth lens element serves as a corrective lens element, which corrects the aberration and distortion of the system and increases the resolution of the photographing optical lens assembly.

In the aforementioned photographing optical lens assembly, preferably, it satisfies the relation: TTL/ImgH<1.95, wherein the distance on the optical axis between the object-side surface of the first lens element and the electronic sensor is TTL, half of the diagonal length of the effective pixel area of the electronic sensor is ImgH. When the photographing optical lens assembly satisfies the above relation, to the photographing optical lens assembly can maintain a compact form so that it can be installed in compact portable electronic products.

According to another aspect of the present invention, a photographing optical lens assembly comprises, in order from the object side to the image side: a first lens element with positive refractive power having a convex object-side surface; a second lens element with negative refractive power having a concave object-side surface and a concave image-side surface; a third lens element with positive refractive power having a concave object-side surface and a convex image-side surface; a fourth lens element with negative refractive power at least one of the object-side and image-side surfaces thereof being aspheric; and a fifth lens element having a convex object-side surface and a concave image-side surface, the object-side and image-side surfaces thereof being aspheric; wherein the photographing optical lens assembly further comprises an aperture stop and an electronic sensor for image formation, the aperture stop is disposed between the imaged object and the third lens element; wherein there are five lens elements with refractive power; and wherein the radius of curvature on the image-side surface of the second lens element is R4, the focal length of the photographing optical lens assembly is f, the distance on the optical axis between the first lens element and the second lens element is T12, the distance on the optical axis between the aperture stop and the electronic sensor is SL, the distance on the optical axis between the object-side surface of the first lens element and the electronic sensor is TTL, and they satisfy the relation:

0.3<R4/f<30.0;

0.5<(T12/f)*100<15.0;

0.65<SL/TTL<1.10

When the aforementioned photographing optical lens assembly satisfies the relation: 0.3<R4/f<30.0, the back focal distance can be effectively increased to allow placement of other components; preferably, they satisfy the relation: 0.5<R4/f<10.0. When the aforementioned photographing optical lens assembly satisfies the relation: 0.5<(T12/f)*100<15.0, the distance on the optical axis between the first and second lens elements is more appropriate, avoiding difficulties in assembly due to tight spacing or too much spacing causing the lens assembly no longer being compact; moreover, they preferably satisfy the relation: 0.5<(T12/f)*100<9.5. When the aforementioned photographing optical lens assembly satisfies the relation: 0.65<SL/TTL<1.10, the photographing optical lens assembly can obtain a good balance between the telecentric feature and wide field of view; preferably, the aperture stop is disposed between the first lens element and the second lens element, and they satisfy the relation: 0.78<SL/TTL<0.93.

In the aforementioned photographing optical lens assembly, preferably, the fourth lens element has a convex object-side surface and a concave image-side surface for favorably correcting the aberration of the system; preferably, the fifth lens element has at least one inflection point on the image-side surface, thereby the angle at which the light is projected onto the sensor from the off-axis field can be effectively reduced to further correct the off-axis aberrations; preferably, the fifth lens element is made of plastic that the adoption of plastic material in lens manufacturing can effectively reduce the weight of the lens assembly while reducing production costs.

In the aforementioned photographing optical lens assembly, preferably, it satisfies the relation: 31.0<V1-V2<42.0, wherein the Abbe number of the first lens element is V1, the Abbe number of the second lens element is V2. When the photographing optical lens assembly satisfies the above relation, the chromatic aberration in the photographing optical lens assembly can be favorably corrected.

In the aforementioned photographing optical lens assembly, preferably, it satisfies the relation: 1.32<f/f1<2.00, wherein the focal length of the photographing optical lens assembly is f, the focal length of the first lens element is f1. When the photographing optical lens assembly satisfies the above relation, the distribution of refractive power of the first lens element is more balanced, effectively maintaining the total track length of the system, being compact, and preventing the high order spherical aberration from begin too large, in order to increase image quality.

In the aforementioned photographing optical lens assembly, preferably, it satisfies the relation: −0.35<f/f5<0.35, wherein the focal length of the photographing optical lens assembly is f, the focal length of the fifth lens element is f5. When the photographing optical lens assembly satisfies the above relation, the fifth lens element serves as a correcting lens which corrects the aberration and distortion of the system while increasing the resolution of the photographing optical lens assembly.

In the aforementioned photographing optical lens assembly, preferably, it satisfies the relation: 23.0<V3-V4<45.0, wherein the Abbe number of the third lens element is V3, the Abbe number of the fourth lens element is V4. When the photographing optical lens assembly satisfies the above relation, the chromatic aberration of the photographing optical lens assembly can be favorably corrected.

In the present photographing optical lens assembly, the lens elements can be made of glass or plastic. If the lens elements are made of glass, there is more freedom in distributing the refractive power of the system. If plastic material is adopted to produce the lens elements, the production cost will be reduced effectively. Additionally, the surfaces of the lens elements can be aspheric and easily made into non-spherical profiles, allowing more design parameter freedom which can be used to reduce aberrations and the number of the lens elements, so that the total track length of the photographing optical lens assembly can be effectively reduced.

In the present photographing optical lens assembly, if a lens element has a convex surface, it means the portion of the surface in proximity to the axis is convex; if a lens element has a concave surface, it means the portion of the surface in proximity to the axis is concave.

Preferred embodiments of the present invention will be described in the following paragraphs by referring to the accompanying drawings.

Figure 2:
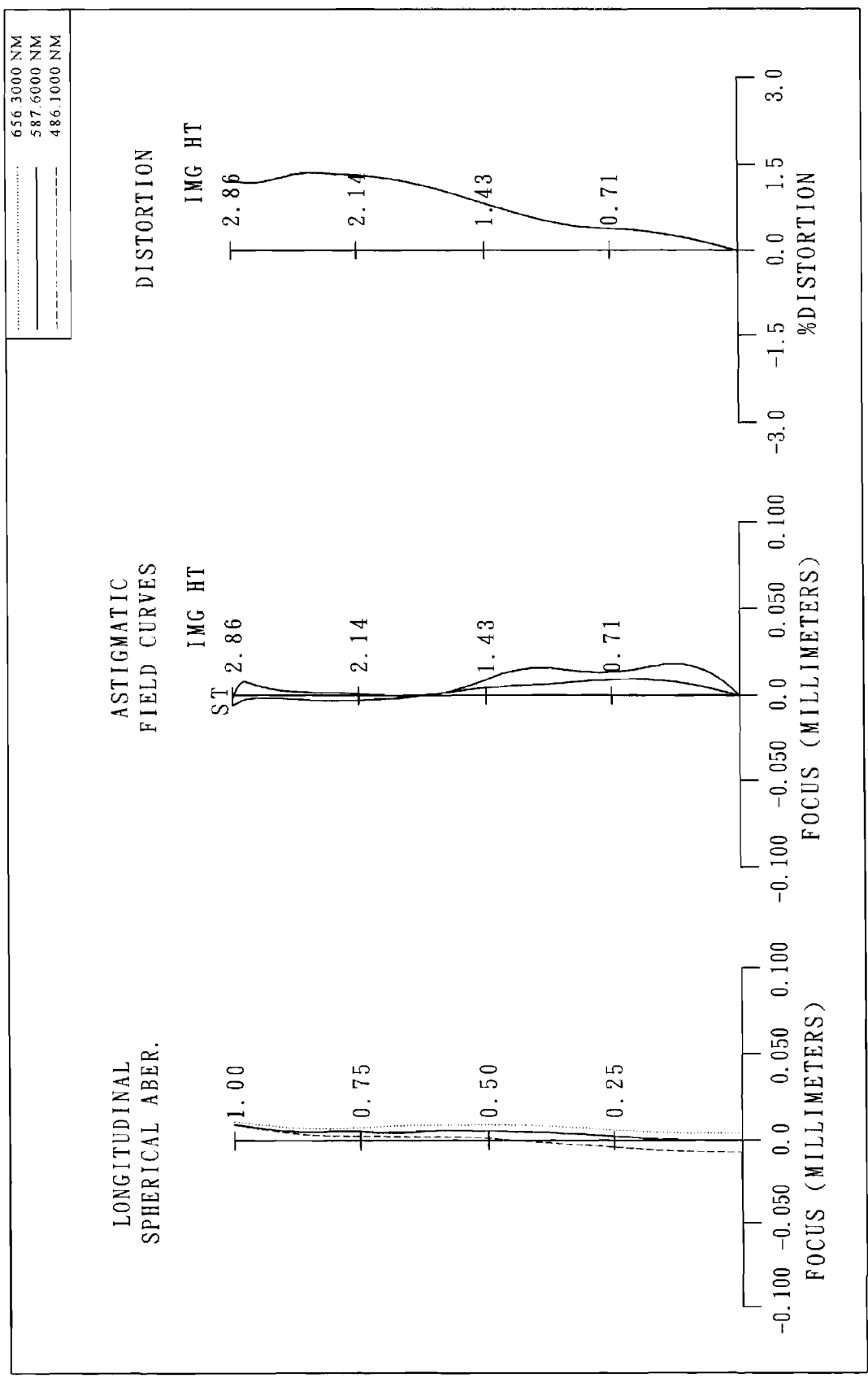
FIG. 2 shows the aberration curves of the first embodiment of the present invention.

FIG. 1 shows a photographing optical lens assembly in accordance with a first embodiment of the present invention, and FIG. 2 shows the aberration curves of the first embodiment of the present invention. The photographing optical lens assembly of the first embodiment of the present invention mainly comprises five lens elements, in order from the object side to the image side: a plastic first lens element 110 with positive refractive power having a convex object-side surface 111 and a convex image-side surface 112, the object-side and image-side surfaces 111 and 112 thereof being aspheric; a plastic second lens element 120 with negative refractive power having a concave object-side surface 121 and a concave image-side surface 122, the object-side and image-side surfaces 121 and 122 thereof being aspheric; a plastic third lens element 130 with positive refractive power having a concave object-side surface 131 and a convex image-side surface 132, the object-side and image-side surfaces 131 and 132 thereof being aspheric; a plastic fourth lens element 140 with negative refractive power having a convex object-side surface 141 and a concave image-side surface 142, the object-side surface 141 and the image-side surface 142 thereof being aspheric; a plastic fifth lens element 150 with positive refractive power having a convex object-side surface 151 and a concave image-side surface 152, the object-side surface 151 and the image-side surface 152 thereof being aspheric, at least one inflection point is formed on the image-side surface 152; wherein an aperture stop 100 is disposed between the imaged object and the first lens elements 110; wherein an IR filter 160 is disposed between the image-side surface 152 of the fifth lens element 150 and an image plane 170; and wherein the IR filter 160 has no influence on the focal length of the photographing optical lens assembly.

The equation of the aspheric surface profiles is expressed as follows:

$$X(Y) = (Y^2/R)/(1 + sqrt(1-(1+k)*(Y/R)^2)) + \sum_i (Ai)*(Y^i)$$

wherein:

X: the height of a point on the aspheric surface at a distance Y from the optical axis relative to the tangential plane at the aspheric surface vertex;

Y: the distance from the point on the curve of the aspheric surface to the optical axis;

k: the conic coefficient;

Ai: the aspheric coefficient of order i.

In the first embodiment of the present photographing optical lens assembly, the focal length of the photographing optical lens assembly is f, and it satisfies the relation: f=3.90 (mm).

In the first embodiment of the present photographing optical lens assembly, the f-number of the photographing optical lens assembly is Fno, and it satisfies the relation: Fno=2.80.

In the first embodiment of the present photographing optical lens assembly, half of the maximal field of view of the photographing optical lens assembly is HFOV, and it satisfies the relation: HFOV=36.0 deg.

In the first embodiment of the present photographing optical lens assembly, the Abbe number of the first lens element 110 is V1, the Abbe number of the second lens element 120 is V2, and they satisfy the relation:

V1−V2=32.5.

In the first embodiment of the present photographing optical lens assembly, the Abbe number of the third lens element 130 is V3, the Abbe number of the fourth lens element 140 is V4, and they satisfy the relation:

V3−V4=32.4.

In the first embodiment of the present photographing optical lens assembly, the thickness on the optical axis of the second lens element 120 is CT2, the focal length of the photographing optical lens assembly is f, and they satisfy the relation:

(CT2/f)*10=1.42.

In the first embodiment of the present photographing optical lens assembly, the radius of curvature of the image-side surface 122 of the second lens element 120 is R4, the focal length of the photographing optical lens assembly is f, and they satisfy the relation:

R4/f=5.79.

In the first embodiment of the present photographing optical lens assembly, the focal length of the photographing optical lens assembly is f, the focal length of the first lens element 110 is f1, and they satisfy the relation:

f/f1=1.14.

In the first embodiment of the present photographing optical lens assembly, the focal length of the photographing optical lens assembly is f, the focal length of the fifth lens element 150 is f5, and they satisfy the relation:

f/f5=0.05.

In the first embodiment of the present photographing optical lens assembly, the focal length of the first lens element 110 is f1, the focal length of the third lens element 130 is f3, and they satisfy the relation:

f1/f3=0.78.

In the first embodiment of the present photographing optical lens assembly, the distance on the optical axis between the first lens element 110 and the second lens element 120 is T12, the focal length of the photographing optical lens assembly is f, and they satisfy the relation:

(T12/f)*100=7.77.

In the first embodiment of the present photographing optical lens assembly, an electronic sensor is disposed at the image plane 170 for image formation. The distance on the optical axis between the aperture stop 100 and the electronic sensor is SL, the distance on the optical axis between the object-side surface 111 of the first lens element 110 and the electronic sensor is TTL, and they satisfy the relation:

SL/TTL=1.02.

In the first embodiment of the present photographing optical lens assembly, the distance on the optical axis between the object-side surface 111 of the first lens element 110 and the electronic sensor is TTL, half of the diagonal length of the effective pixel area of the electronic sensor is ImgH, and they satisfy the relation:

TTL/ImgH=1.80.

The detailed optical data of the first embodiment is shown in FIG. 13 (TABLE 1), and the aspheric surface data is shown in FIGS. 14A and 14B (TABLES 2A and 2B), wherein the units of the radius of curvature, the thickness and the focal length are expressed in mm, and HFOV is half of the maximal field of view.

Figure 3:
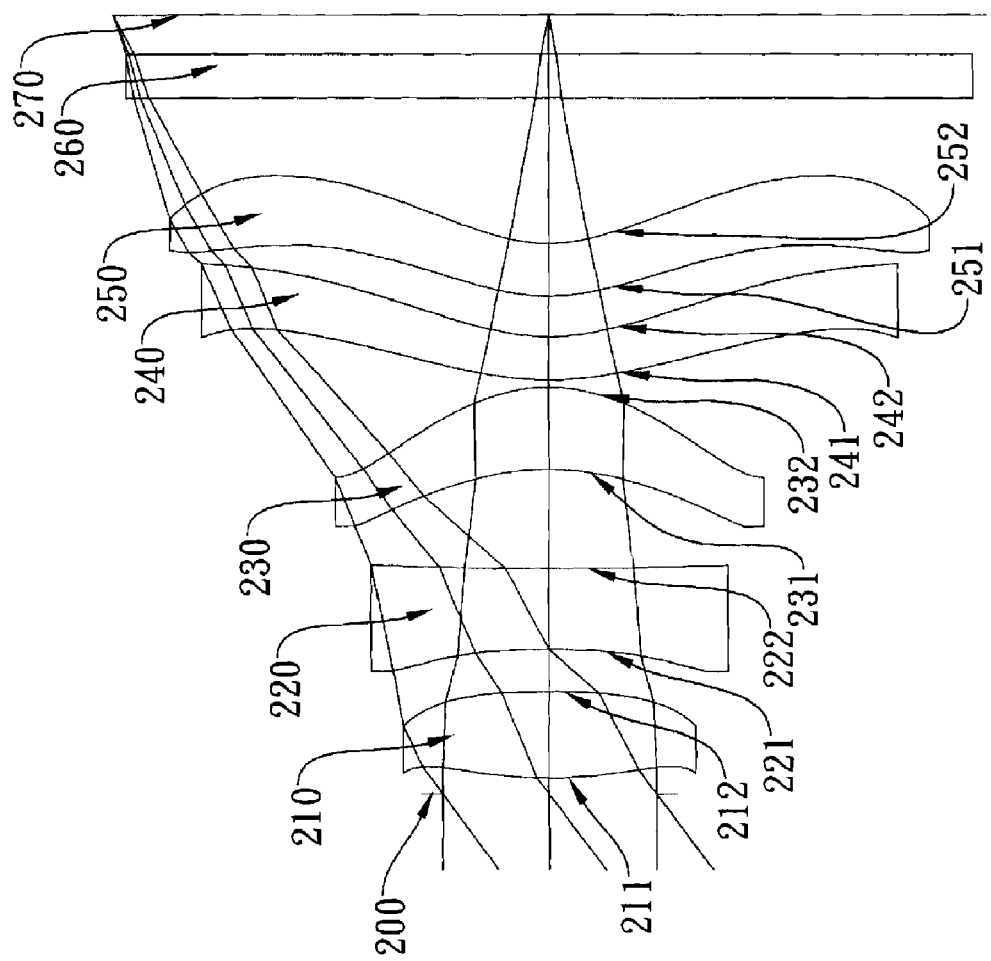
FIG. 3 shows a photographing optical lens assembly in accordance with a second embodiment of the present invention.
Figure 4:
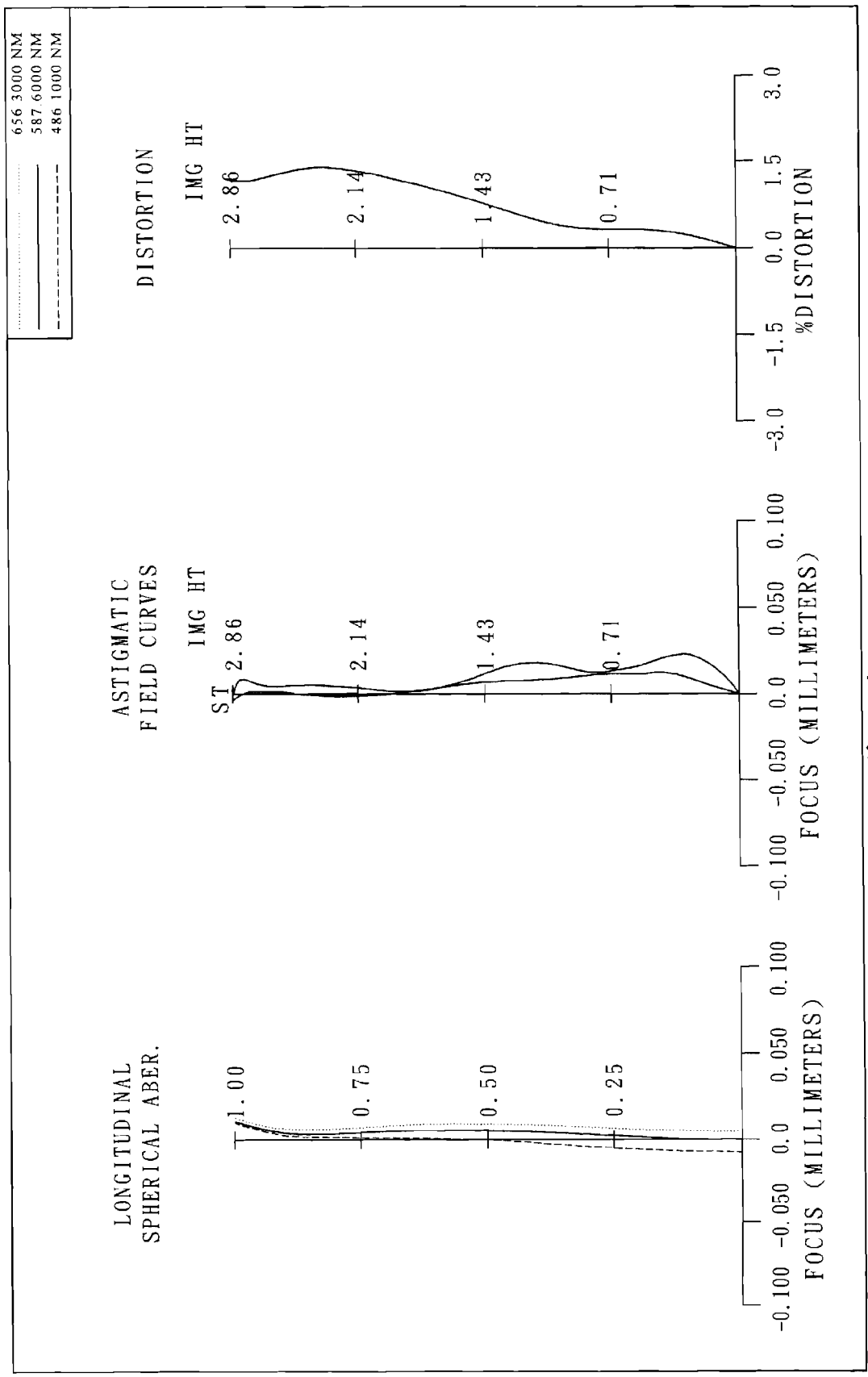
FIG. 4 shows the aberration curves of the second embodiment of the present invention.

FIG. 3 shows a photographing optical lens assembly in accordance with a second embodiment of the present invention, and FIG. 4 shows the aberration curves of the second embodiment of the present invention. The photographing optical lens assembly of the second embodiment of the present invention mainly comprises five lens elements, in order from the object side to the image side: a plastic first lens element 210 with positive refractive power having a convex object-side surface 211 and a convex image-side surface 212, the object-side and image-side surfaces 211 and 212 thereof being aspheric; a plastic second lens element 220 with negative refractive power having a concave object-side surface 221 and a concave image-side surface 222, the object-side and image-side surfaces 221 and 222 thereof being aspheric; a plastic third lens element 230 with positive refractive power having a concave object-side surface 231 and a convex image-side surface 232, the object-side and image-side surfaces 231 and 232 thereof being aspheric; a plastic fourth lens element 240 with negative refractive power having a convex object-side surface 241 and a concave image-side surface 242, the object-side and image-side surfaces 241 and 242 thereof being aspheric; and a plastic fifth lens element 250 with negative refractive power having a convex object-side surface 251 and a concave image-side surface 252, the object-side and image-side surfaces 251 and 252 thereof being aspheric, at least one inflection point formed on the image-side surface 252; wherein an aperture stop 200 is disposed between the imaged object and the first lens element 210; wherein an IR filter 260 is disposed between the image-side surface 252 of the fifth lens element 250 and an image plane 270; and wherein the IR filter 260 has no influence on the focal length of the photographing optical lens assembly.

The equation of the aspheric surface profiles of the second embodiment has the same form as that of the first embodiment.

In the second embodiment of the present photographing optical lens assembly, the focal length of the photographing optical lens assembly is f, and it satisfies the relation: f=3.94 (mm).

In the second embodiment of the present photographing optical lens assembly, the f-number of the photographing optical lens assembly is Fno, and it satisfies the relation: Fno=2.80.

In the second embodiment of the present photographing optical lens assembly, half of the maximal field of view of the photographing optical lens assembly is HFOV, and it satisfies the relation: HFOV=35.7 deg.

In the second embodiment of the present photographing optical lens assembly, the Abbe number of the first lens element 210 is V1, the Abbe number of the second lens element 220 is V2, and they satisfy the relation:

$V1-V2=32.5.$

In the second embodiment of the present photographing optical lens assembly, the Abbe number of the third lens element 230 is V3, the Abbe number of the fourth lens element 240 is V4, and they satisfy the relation:

$V3-V4=32.4.$

In the second embodiment of the present photographing optical lens assembly, the thickness on the optical axis of the second lens element 220 is CT2, the focal length of the photographing optical lens assembly is f, and they satisfy the relation:

$(CT2/f)*10=1.43.$

In the second embodiment of the present photographing optical lens assembly, the radius of curvature of the image-side surface 222 of the second lens element 220 is R4, the focal length of the photographing optical lens assembly is f, and they satisfy the relation:

$R4/f=5.97.$

In the second embodiment of the present photographing optical lens assembly, the focal length of the photographing optical lens assembly is f, the focal length of the first lens element 210 is f1, and they satisfy the relation:

$f/f1=1.16.$

In the second embodiment of the present photographing optical lens assembly, the focal length of the photographing optical lens assembly is f, the focal length of the fifth lens element 250 is f5, and they satisfy the relation:

$f/f5=-0.16.$

In the second embodiment of the present photographing optical lens assembly, the focal length of the first lens element 210 is f1, the focal length of the third lens element 230 is f3, and they satisfy the relation:

$f1/f3=0.84.$

In the second embodiment of the present photographing optical lens assembly, the distance on the optical axis between the first lens element 210 and the second lens element 220 is T12, the focal length of the photographing optical lens assembly is f, and they satisfy the relation:

$(T12/f)*100=7.46.$

In the second embodiment of the present photographing optical lens assembly, an electronic sensor is disposed at the image plane 270 for image formation. The distance on the optical axis between the aperture stop 200 and the electronic sensor is SL, the distance on the optical axis between the object-side surface 211 of the first lens element 210 and the electronic sensor is TTL, and they satisfy the relation:

$SL/TTL=1.02.$

In the second embodiment of the present photographing optical lens assembly, the distance on the optical axis between the object-side surface 211 of the first lens element 210 and the electronic sensor is TTL, half of the diagonal length of the effective pixel area of the electronic sensor is ImgH, and they satisfy the relation:

$TTL/ImgH=1.80.$

The detailed optical data of the second embodiment is shown in FIG. 15 (TABLE 3), and the aspheric surface data is shown in FIGS. 16A and 16B (TABLES 4A and 4B), wherein the units of the radius of curvature, the thickness and the focal length are expressed in mm, and HFOV is half of the maximal field of view.

Figure 5:
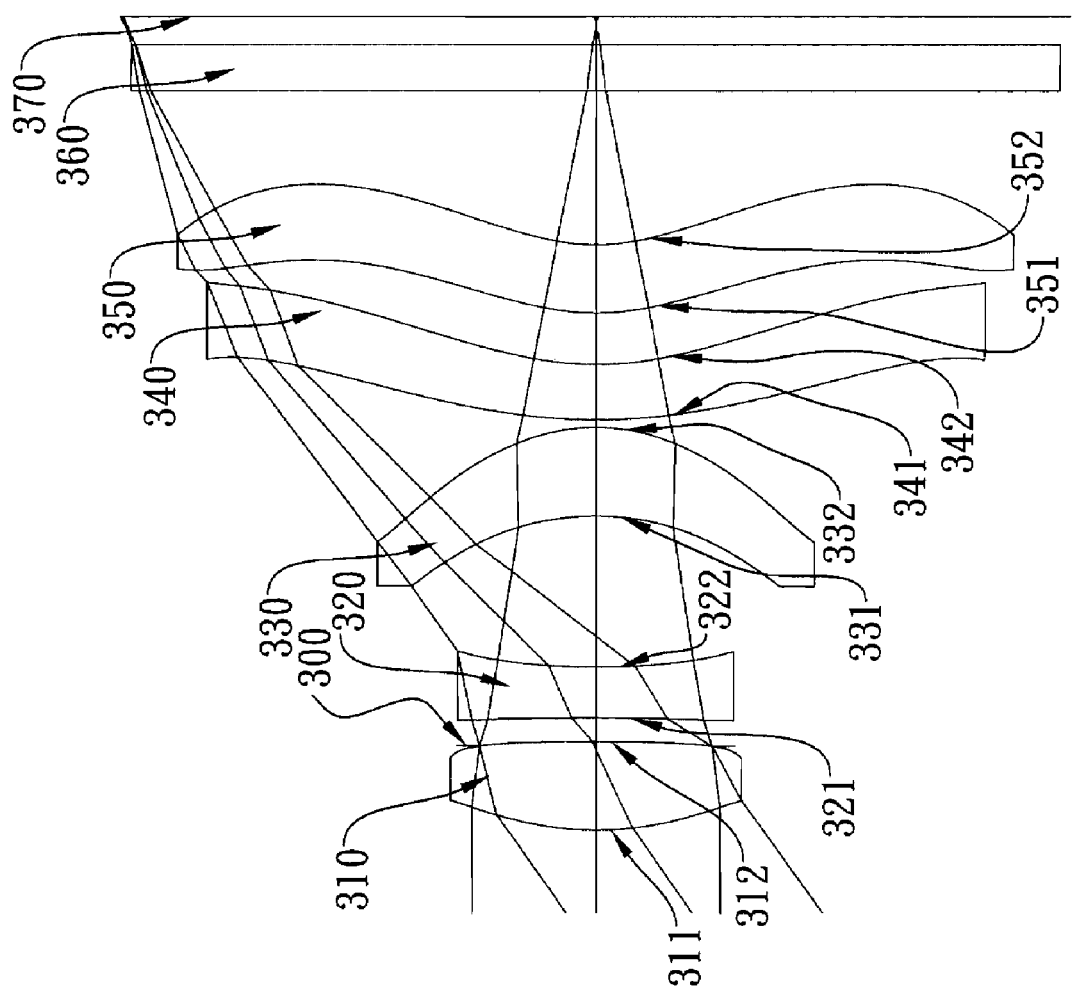
FIG. 5 shows a photographing optical lens assembly in accordance with a third embodiment of the present invention.
Figure 6:
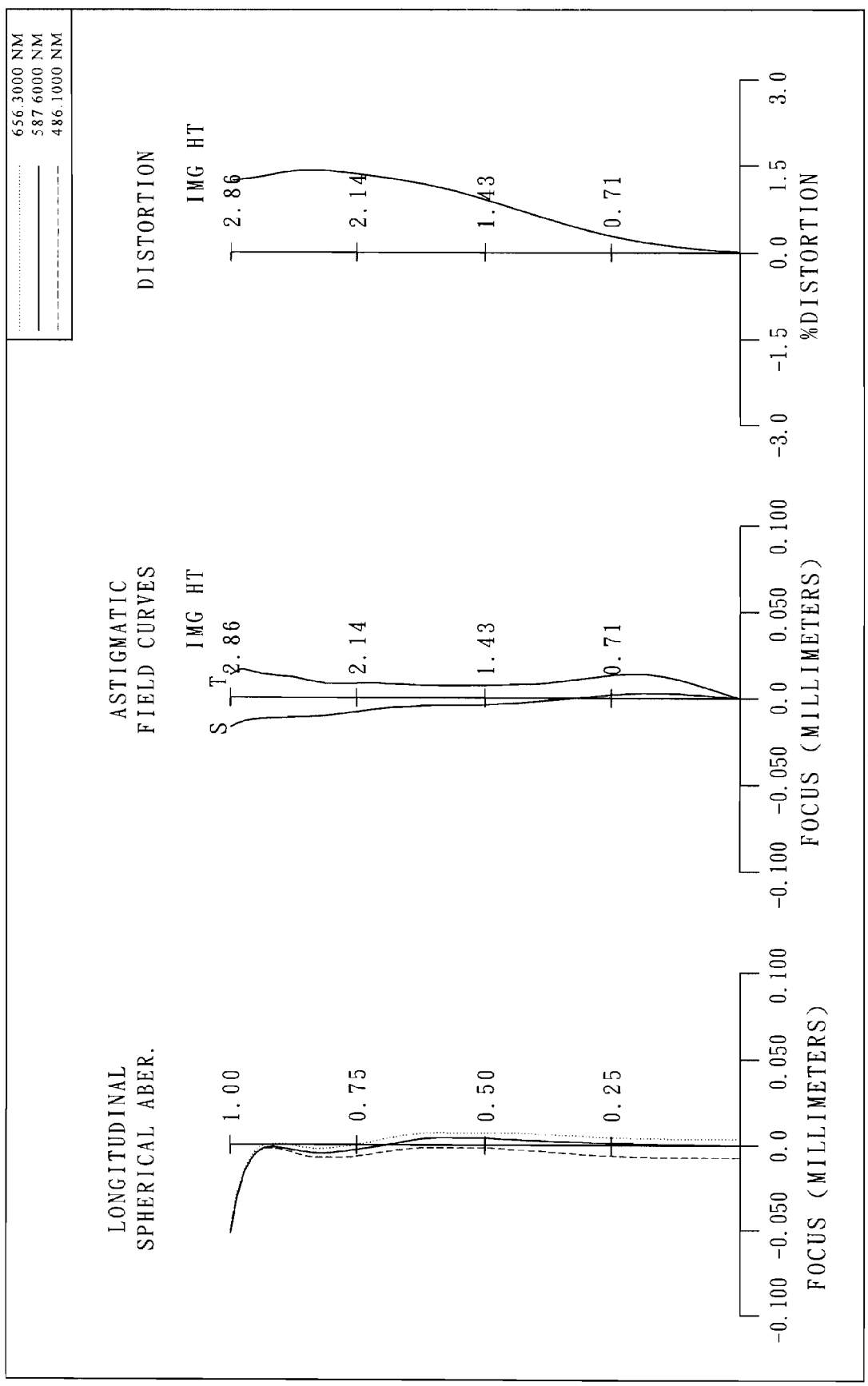
FIG. 6 shows the aberration curves of the third embodiment of the present invention.

FIG. 5 shows a photographing optical lens assembly in accordance with a third embodiment of the present invention, and FIG. 6 shows the aberration curves of the third embodiment of the present invention. The photographing optical lens assembly of the third embodiment of the present invention mainly comprises five lens elements, in order from the object side to the image side: a plastic first lens element 310 with positive refractive power having a convex object-side surface 311 and a convex image-side surface 312, the object-side and image-side surfaces 311 and 312 thereof being aspheric; a plastic second lens element 320 with negative refractive power having a concave object-side surface 321 and a concave image-side surface 322, the object-side and image-side surfaces 321 and 322 thereof being aspheric; a plastic third lens element 330 with positive refractive power having a concave object-side surface 331 and a convex image-side surface 332, the object-side and image-side surfaces 331 and 332 thereof being aspheric; a plastic fourth lens element 340 with negative refractive power having a convex object-side surface 341 and a concave image-side surface 342, the object-side and image-side surfaces 341 and 342 thereof being aspheric; and a plastic fifth lens element 350 with negative refractive power having a convex object-side surface 351 and a concave image-side surface 352, the object-side and image-side surfaces 351 and 352 thereof being aspheric, at least one inflection point formed on the image-side surface 352; wherein an aperture stop 300 is disposed between the first and second lens elements 310 and 320; wherein an IR filter 360 is disposed between the image-side surface 352 of the fifth lens element 350 and an image plane 370; and wherein the IR filter 360 has no influence on the focal length of the photographing optical lens assembly.

The equation of the aspheric surface profiles of the third embodiment has the same form as that of the first embodiment.

In the third embodiment of the present photographing optical lens assembly, the focal length of the photographing optical lens assembly is f, and it satisfies the relation: f=4.23 (mm).

In the third embodiment of the present photographing optical lens assembly, the f-number of the photographing optical lens assembly is Fno, and it satisfies the relation: Fno=2.78.

In the third embodiment of the present photographing optical lens assembly, half of the maximal field of view of the photographing optical lens assembly is HFOV, and it satisfies the relation: HFOV=33.8 deg.

In the third embodiment of the present photographing optical lens assembly, the Abbe number of the first lens element 310 is V1, the Abbe number of the second lens element 320 is V2, and they satisfy the relation:

$$V1-V2=32.5.$$

In the third embodiment of the present photographing optical lens assembly, the Abbe number of the third lens element 330 is V3, the Abbe number of the fourth lens element 340 is V4, and they satisfy the relation:

$$V3-V4=23.8.$$

In the third embodiment of the present photographing optical lens assembly, the thickness on the optical axis of the second lens element 320 is CT2, the focal length of the photographing optical lens assembly is f, and they satisfy the relation:

$$(CT2/f)*10=0.80.$$

In the third embodiment of the present photographing optical lens assembly, the radius of curvature of the image-side surface 322 of the second lens element 320 is R4, the focal length of the photographing optical lens assembly is f, and they satisfy the relation:

$$R4/f=1.15.$$

In the third embodiment of the present photographing optical lens assembly, the focal length of the photographing optical lens assembly is f, the focal length of the first lens element 310 is f1, and they satisfy the relation:

$$f/f1=1.33.$$

In the third embodiment of the present photographing optical lens assembly, the focal length of the photographing optical lens assembly is f, the focal length of the fifth lens element 350 is f5, and they satisfy the relation:

$$f/f5=-0.06.$$

In the third embodiment of the present photographing optical lens assembly, the focal length of the first lens element 310 is f1, the focal length of the third lens element 330 is f3, and they satisfy the relation:

$$f1/f3=0.65.$$

In the third embodiment of the present photographing optical lens assembly, the distance on the optical axis between the first lens element 310 and the second lens element 320 is T12, the focal length of the photographing optical lens assembly is f, and they satisfy the relation:

$$(T12/f)*100=3.66.$$

In the third embodiment of the present photographing optical lens assembly, an electronic sensor is disposed at the image plane 370 for image formation. The distance on the optical axis between the aperture stop 300 and the electronic sensor is SL, the distance on the optical axis between the object-side surface 311 of the first lens element 310 and the electronic sensor is TTL, and they satisfy the relation:

$$SL/TTL=0.90.$$

In the third embodiment of the present photographing optical lens assembly, the distance on the optical axis between the object-side surface 311 of the first lens element 310 and the electronic sensor is TTL, half of the diagonal length of the effective pixel area of the electronic sensor is ImgH, and they satisfy the relation:

$$TTL/ImgH=1.82.$$

The detailed optical data of the third embodiment is shown in FIG. 17 (TABLE 5), and the aspheric surface data is shown in FIGS. 18A and 18B (TABLES 6A and 6B), wherein the units of the radius of curvature, the thickness and the focal length are expressed in mm, and HFOV is half of the maximal field of view.

Figure 7:
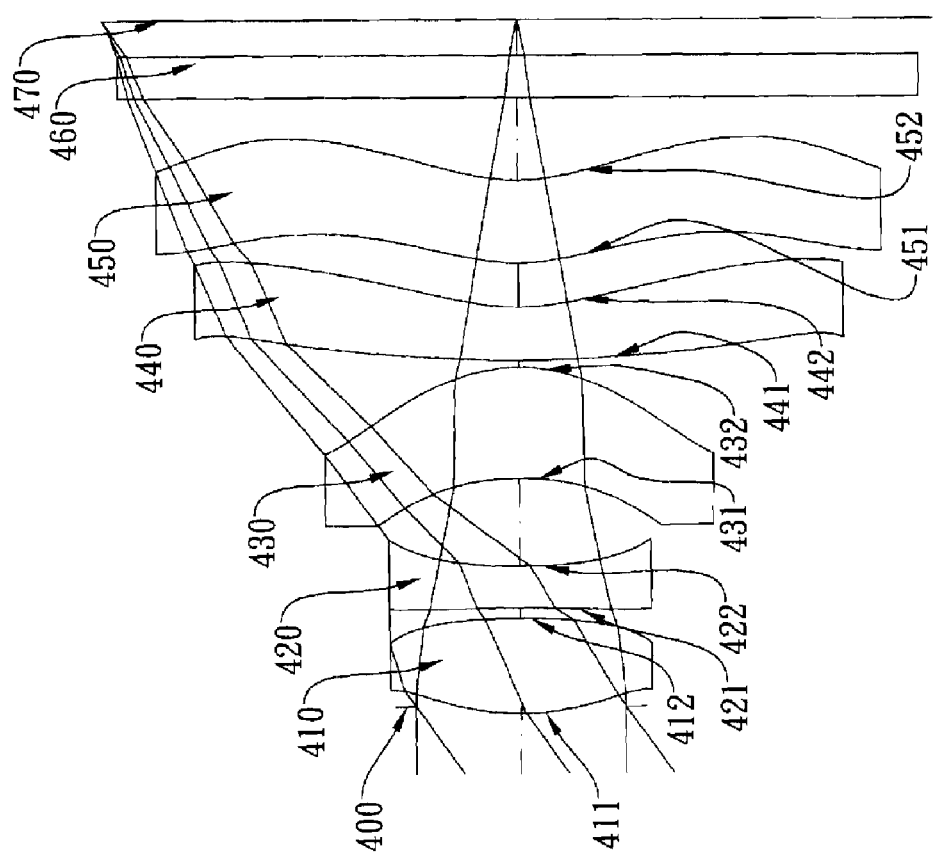
FIG. 7 shows a photographing optical lens assembly in accordance with a fourth embodiment of the present invention.
Figure 8:
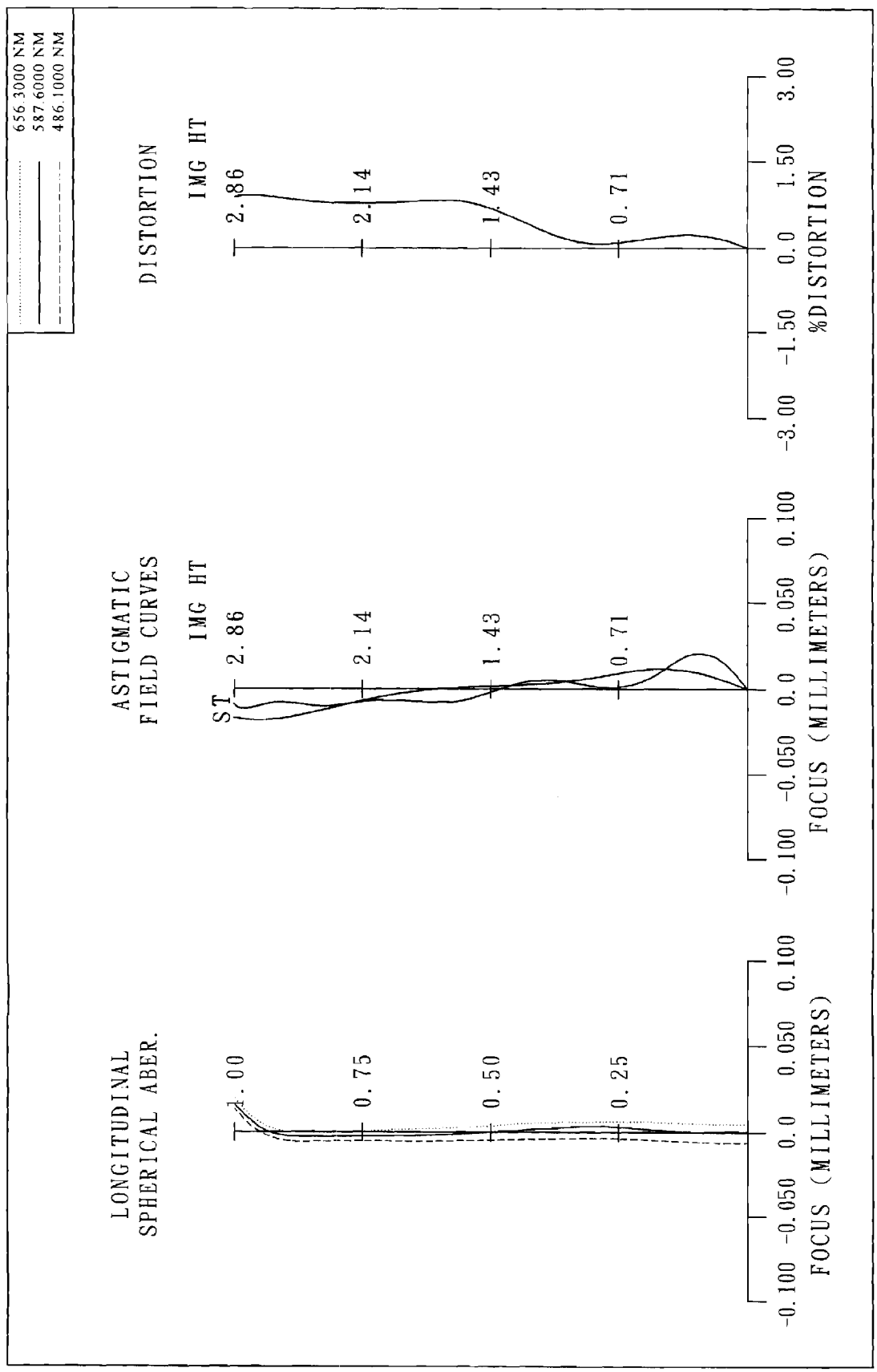
FIG. 8 shows the aberration curves of the fourth embodiment of the present invention.

FIG. 7 shows a photographing optical lens assembly in accordance with a fourth embodiment of the present invention, and FIG. 8 shows the aberration curves of the fourth embodiment of the present invention. The photographing optical lens assembly of the fourth embodiment of the present invention mainly comprises five lens elements, in order from the object side to the image side: a plastic first lens element 410 with positive refractive power having a convex object-side surface 411 and a convex image-side surface 412, the object-side and image-side surfaces 411 and 412 thereof being aspheric; a plastic second lens element 420 with negative refractive power having a concave object-side surface 421 and a concave image-side surface 422, the object-side and image-side surfaces 421 and 422 thereof being aspheric; a plastic third lens element 430 with positive refractive power having a concave object-side surface 431 and a convex image-side surface 432, the object-side and image-side surfaces 431 and 432 thereof being aspheric; a plastic fourth lens element 440 with negative refractive power having a convex object-side surface 441 and a concave image-side surface 442, the object-side and image-side surfaces 441 and 442 thereof being aspheric; and a plastic fifth lens element 450 with positive refractive power having a convex object-side surface 451 and a concave image-side surface 452, the object-side and image-side surfaces 451 and 452 thereof being aspheric, at least one inflection point formed on the image-side surface 452; wherein an aperture stop 400 is disposed between the imaged object and the first lens element 410; wherein an IR filter 460 is disposed between the image-side surface 452 of the fifth lens element 450 and an image plane 470; and wherein the IR filter 460 has no influence on the focal length of the photographing optical lens assembly. The equation of the aspheric surface profiles of the fourth embodiment has the same form as that of the first embodiment.

In the fourth embodiment of the present photographing optical lens assembly, the focal length of the photographing optical lens assembly is f, and it satisfies the relation: f=4.06 (mm).

In the fourth embodiment of the present photographing optical lens assembly, the f-number of the photographing optical lens assembly is Fno, and it satisfies the relation: Fno=2.80.

In the fourth embodiment of the present photographing optical lens assembly, half of the maximal field of view of the photographing optical lens assembly is HFOV, and it satisfies the relation: HFOV=35.0 deg.

In the fourth embodiment of the present photographing optical lens assembly, the Abbe number of the first lens element 410 is V1, the Abbe number of the second lens element 420 is V2, and they satisfy the relation:

$$V1-V2=32.5.$$

In the fourth embodiment of the present photographing optical lens assembly, the Abbe number of the third lens element 430 is V3, the Abbe number of the fourth lens element 440 is V4, and they satisfy the relation:

$$V3-V4=-0.1.$$

In the fourth embodiment of the present photographing optical lens assembly, the thickness on the optical axis of the second lens element 420 is CT2, the focal length of the photographing optical lens assembly is f, and they satisfy the relation:

$$(CT2/f)*10=0.74.$$

In the fourth embodiment of the present photographing optical lens assembly, the radius of curvature of the image-side surface 422 of the second lens element 420 is R4, the focal length of the photographing optical lens assembly is f, and they satisfy the relation:

$$R4/f=0.97.$$

In the fourth embodiment of the present photographing optical lens assembly, the focal length of the photographing optical lens assembly is f, the focal length of the first lens element 410 is f1, and they satisfy the relation:

$$f/f1=1.64.$$

In the fourth embodiment of the present photographing optical lens assembly, the focal length of the photographing optical lens assembly is f, the focal length of the fifth lens element 450 is f5, and they satisfy the relation:

$$f/f5=0.21.$$

In the fourth embodiment of the present photographing optical lens assembly, the focal length of the first lens element 410 is f1, the focal length of the third lens element 430 is f3, and they satisfy the relation:

$$f1/f3=0.62.$$

In the fourth embodiment of the present photographing optical lens assembly, the distance on the optical axis between the first lens element 410 and the second lens element 420 is T12, the focal length of the photographing optical lens assembly is f, and they satisfy the relation:

$$(T12/f)*100=1.95.$$

In the fourth embodiment of the present photographing optical lens assembly, an electronic sensor is disposed at the image plane 470 for image formation. The distance on the optical axis between the aperture stop 400 and the electronic sensor is SL, the distance on the optical axis between the object-side surface 411 of the first lens element 410 and the electronic sensor is TTL, and they satisfy the relation:

$$SL/TTL=0.99.$$

In the fourth embodiment of the present photographing optical lens assembly, the distance on the optical axis between the object-side surface 411 of the first lens element 410 and the electronic sensor is TTL, half of the diagonal length of the effective pixel area of the electronic sensor is ImgH, and they satisfy the relation:

$$TTL/ImgH=1.72.$$

The detailed optical data of the fourth embodiment is shown in FIG. 19 (TABLE 7), and the aspheric surface data is shown in FIG. 20 (TABLE 8), wherein the units of the radius of curvature, the thickness and the focal length are expressed in mm, and HFOV is half of the maximal field of view.

Figure 9:
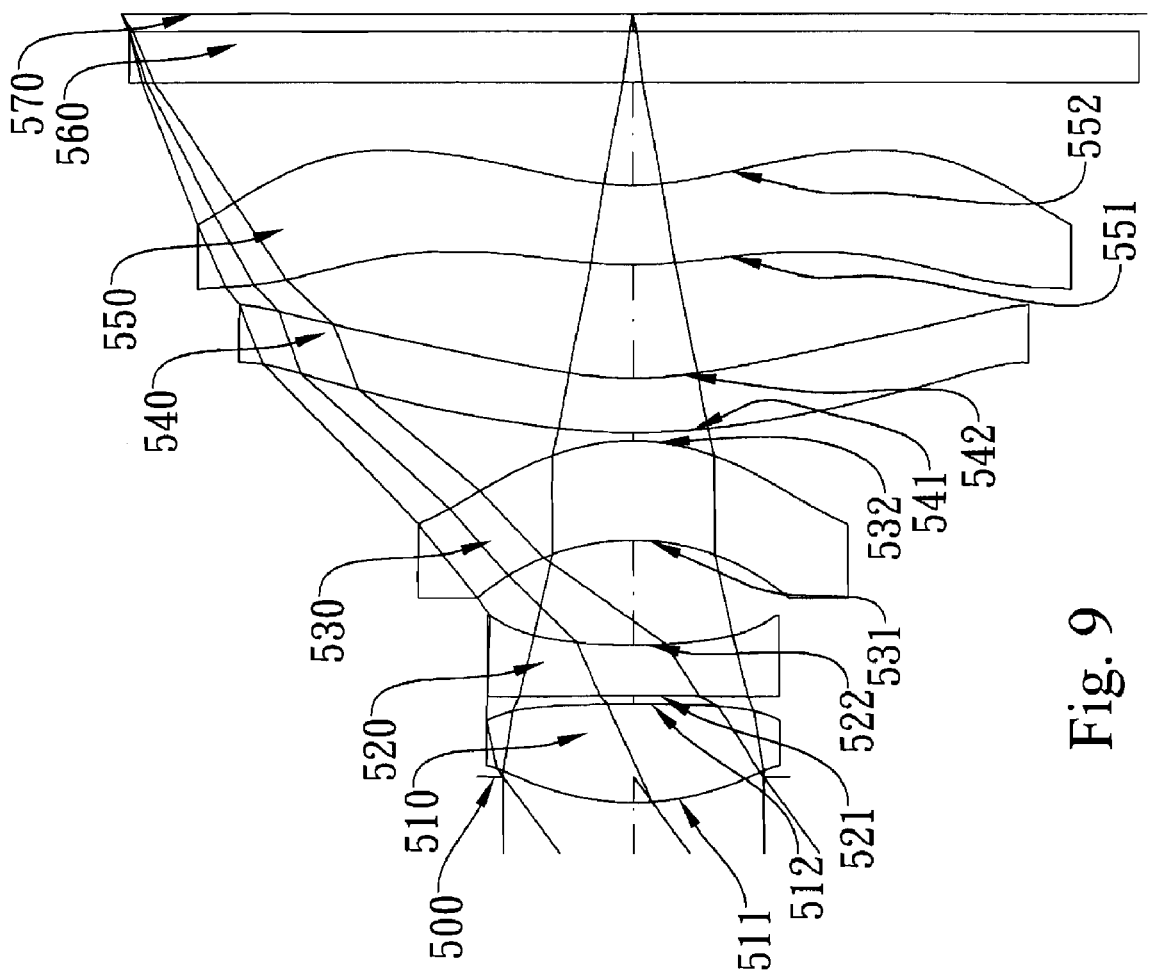
FIG. 9 shows a photographing optical lens assembly in accordance with a fifth embodiment of the present invention.
Figure 10:
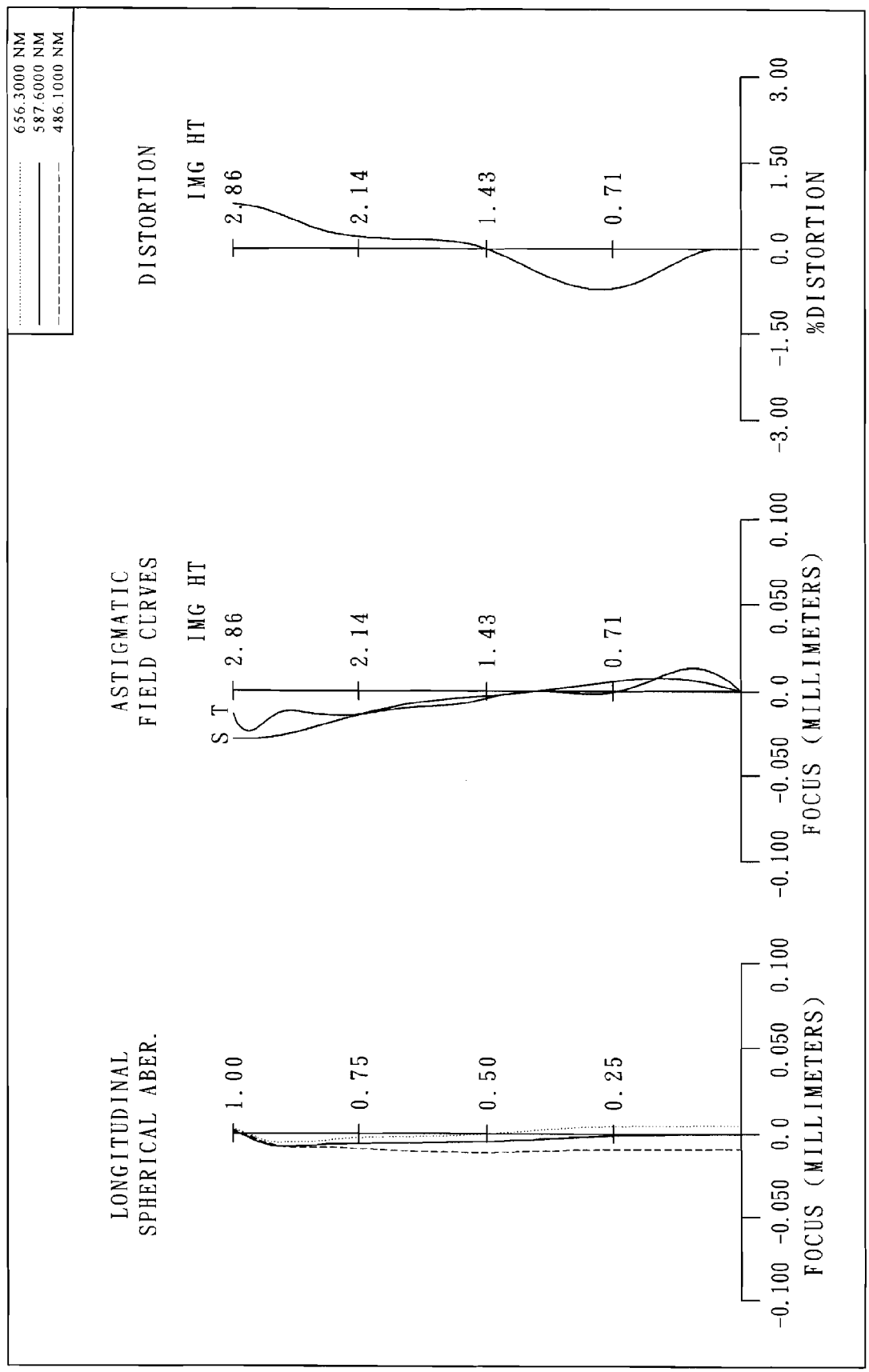
FIG. 10 shows the aberration curves of the fifth embodiment of the present invention.

FIG. 9 shows a photographing optical lens assembly in accordance with a fifth embodiment of the present invention, and FIG. 10 shows the aberration curves of the fifth embodiment of the present invention. The photographing optical lens assembly of the fifth embodiment of the present invention mainly comprises five lens elements, in order from the object side to the image side: a plastic first lens element 510 with positive refractive power having a convex object-side surface 511 and a convex image-side surface 512, the object-side and image-side surfaces 511 and 512 thereof being aspheric; a plastic second lens element 520 with negative refractive power having a concave object-side surface 521 and a concave image-side surface 522, the object-side and image-side surfaces 521 and 522 thereof being aspheric; a plastic third lens element 530 with positive refractive power having a concave object-side surface 531 and a convex image-side surface 532, the object-side and image-side surfaces 531 and 532 thereof being aspheric; a plastic fourth lens element 540 with negative refractive power having a convex object-side surface 541 and a concave image-side surface 542, the object-side and image-side surfaces 541 and 542 thereof being aspheric; and a plastic fifth lens element 550 with negative refractive power having a convex object-side surface 551 and a concave image-side surface 552, the object-side and image-side surfaces 551 and 552 thereof being aspheric, at least one inflection point formed on the image-side surface 552; wherein an aperture stop 500 is disposed between the imaged object and the first lens elements 510; wherein an IR filter 560 is disposed between the image-side surface 552 of the fifth lens element 550 and an image plane 570; and wherein the IR filter 560 has no influence on the focal length of the photographing optical lens assembly.

The equation of the aspheric surface profiles of the fifth embodiment has the same form as that of the first embodiment.

In the fifth embodiment of the present photographing optical lens assembly, the focal length of the photographing optical lens assembly is f, and it satisfies the relation: f=4.06 (mm).

In the fifth embodiment of the present photographing optical lens assembly, the f-number of the photographing optical lens assembly is Fno, and it satisfies the relation: Fno=2.80.

In the fifth embodiment of the present photographing optical lens assembly, half of the maximal field of view of the photographing optical lens assembly is HFOV, and it satisfies the relation: HFOV=35.0 deg.

In the fifth embodiment of the present photographing optical lens assembly, the Abbe number of the first lens element 510 is V1, the Abbe number of the second lens element 520 is V2, and they satisfy the relation:

$$V1-V2=32.5.$$

In the fifth embodiment of the present photographing optical lens assembly, the Abbe number of the third lens element 530 is V3, the Abbe number of the fourth lens element 540 is V4, and they satisfy the relation:

$$V3-V4=-0.1.$$

In the fifth embodiment of the present photographing optical lens assembly, the thickness on the optical axis of the second lens element 520 is CT2, the focal length of the photographing optical lens assembly is f, and they satisfy the relation:

$$(CT2/f)*10=0.74.$$

In the fifth embodiment of the present photographing optical lens assembly, the radius of curvature of the image-side surface 522 of the second lens element 520 is R4, the focal length of the photographing optical lens assembly is f, and they satisfy the relation:

$R4/f=0.94$.

In the fifth embodiment of the present photographing optical lens assembly, the focal length of the photographing optical lens assembly is f, the focal length of the first lens element 510 is f1, and they satisfy the relation:

$f/f1=1.75$.

In the fifth embodiment of the present photographing optical lens assembly, the focal length of the photographing optical lens assembly is f, the focal length of the fifth lens element 550 is f5, and they satisfy the relation:

$f/f5=-0.52$.

In the fifth embodiment of the present photographing optical lens assembly, the focal length of the first lens element 510 is f1, the focal length of the third lens element 530 is f3, and they satisfy the relation:

$f1/f3=0.32$.

In the fifth embodiment of the present photographing optical lens assembly, the distance on the optical axis between the first lens element 510 and the second lens element 520 is T12, the focal length of the photographing optical lens assembly is f, and they satisfy the relation:

$(T12/f)*100=1.23$.

In the fifth embodiment of the present photographing optical lens assembly, an electronic sensor is disposed at the image plane 570 for image formation. The distance on the optical axis between the aperture stop 500 and the electronic sensor is SL, the distance on the optical axis between the object-side surface 511 of the first lens element 510 and the electronic sensor is TTL, and they satisfy the relation:

$SL/TTL=0.97$.

In the fifth embodiment of the present photographing optical lens assembly, the distance on the optical axis between the object-side surface 511 of the first lens element 510 and the electronic sensor is TTL, half of the diagonal length of the effective pixel area of the electronic sensor is ImgH, and they satisfy the relation:

$TTL/ImgH=1.58$.

The detailed optical data of the fifth embodiment is shown in FIG. 21 (TABLE 9), and the aspheric surface data is shown in FIG. 22 (TABLE 10), wherein the units of the radius of curvature, the thickness and the focal length are expressed in mm, and HFOV is half of the maximal field of view.

Figure 11:
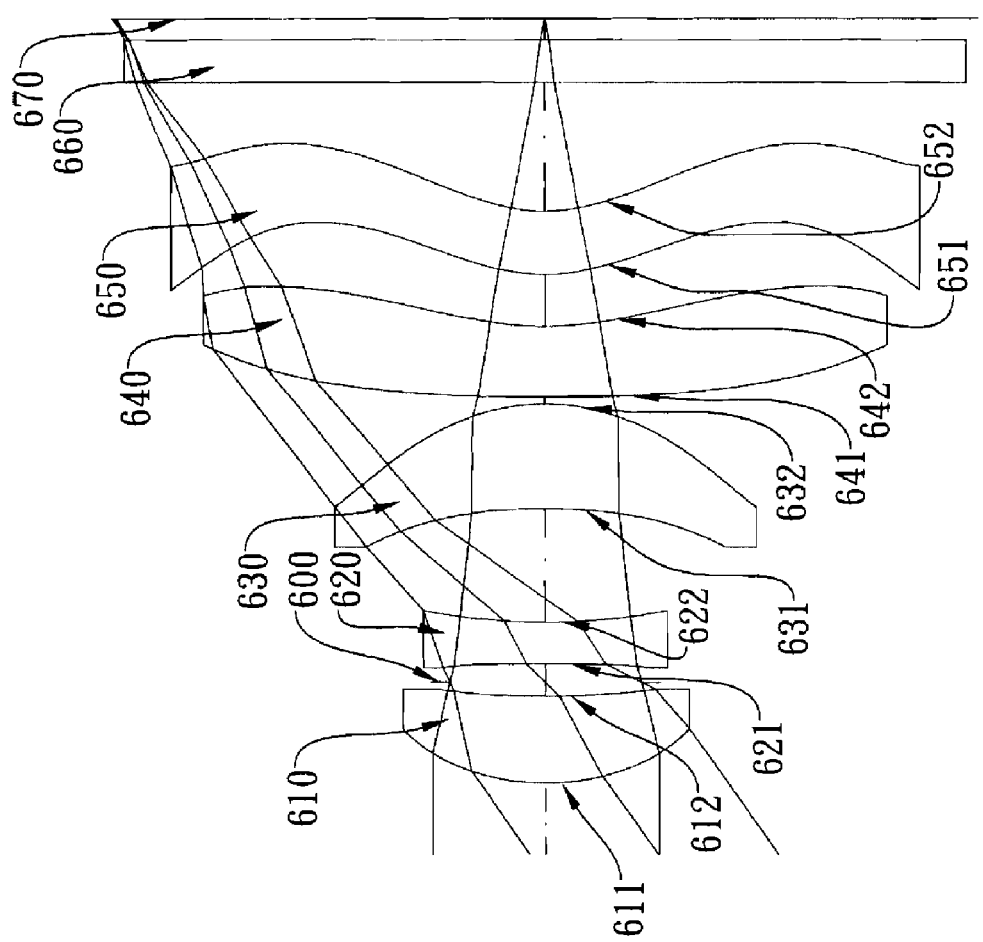
FIG. 11 shows a photographing optical lens assembly in accordance with a sixth embodiment of the present invention.
Figure 12:
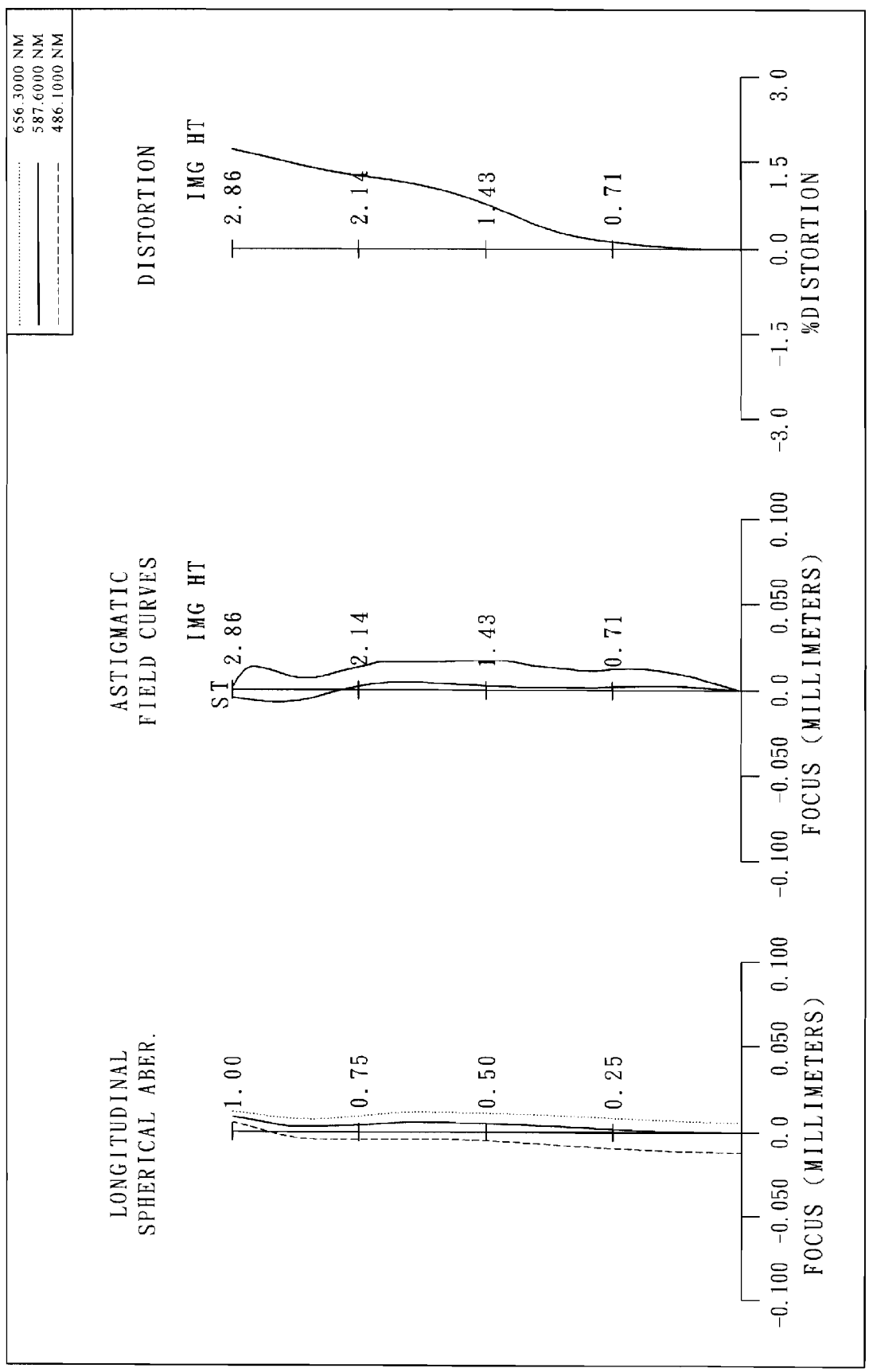
FIG. 12 shows the aberration curves of the sixth embodiment of the present invention.

FIG. 11 shows a photographing optical lens assembly in accordance with a sixth embodiment of the present invention, and FIG. 12 shows the aberration curves of the sixth embodiment of the present invention. The photographing optical lens assembly of the sixth embodiment of the present invention mainly comprises five lens elements, in order from the object side to the image side: a plastic first lens element 610 with positive refractive power having a convex object-side surface 611 and a concave image-side surface 612, the object-side and image-side surfaces 611 and 612 thereof being aspheric; a plastic second lens element 620 with negative refractive power having a concave object-side surface 621 and a concave image-side surface 622, the object-side and image-side surfaces 621 and 622 thereof being aspheric; a plastic third lens element 630 with positive refractive power having a concave object-side surface 631 and a convex image-side surface 632, the object-side and image-side surfaces 631 and 632 thereof being aspheric; a plastic fourth lens element 640 with negative refractive power having a convex object-side surface 641 and a concave image-side surface 642, the object-side and image-side surfaces 641 and 642 thereof being aspheric; and a plastic fifth lens element 650 with positive refractive power having a convex object-side surface 651 and a concave image-side surface 652, the object-side and image-side surfaces 651 and 652 thereof being aspheric, at least one inflection point formed on the image-side surface 652; wherein an aperture stop 600 is disposed between the first lens element 610 and second lens elements 620; wherein an IR filter 660 is disposed between the image-side surface 652 of the fifth lens element 650 and an image plane 670; and wherein the IR filter 660 has no influence on the focal length of the photographing optical lens assembly.

The equation of the aspheric surface profiles of the sixth embodiment has the same form as that of the first embodiment.

In the sixth embodiment of the present photographing optical lens assembly, the focal length of the photographing optical lens assembly is f, and it satisfies the relation: $f=4.22$ (mm).

In the sixth embodiment of the present photographing optical lens assembly, the f-number of the photographing optical lens assembly is Fno, and it satisfies the relation: $Fno=2.78$.

In the sixth embodiment of the present photographing optical lens assembly, half of the maximal field of view of the photographing optical lens assembly is HFOV, and it satisfies the relation: $HFOV=33.7$ deg.

In the sixth embodiment of the present photographing optical lens assembly, the Abbe number of the first lens element 610 is V1, the Abbe number of the second lens element 620 is V2, and they satisfy the relation:

$V1-V2=32.5$.

In the sixth embodiment of the present photographing optical lens assembly, the Abbe number of the third lens element 630 is V3, the Abbe number of the fourth lens element 640 is V4, and they satisfy the relation:

$V3-V4=-0.1$.

In the sixth embodiment of the present photographing optical lens assembly, the thickness on the optical axis of the second lens element 620 is CT2, the focal length of the photographing optical lens assembly is f, and they satisfy the relation:

$(CT2/f)*10=0.71$.

In the sixth embodiment of the present photographing optical lens assembly, the radius of curvature of the image-side surface 622 of the second lens element 620 is R4, the focal length of the photographing optical lens assembly is f, and they satisfy the relation:

$R4/f=1.05$.

In the sixth embodiment of the present photographing optical lens assembly, the focal length of the photographing optical lens assembly is f, the focal length of the first lens element 610 is f1, and they satisfy the relation:

$f/f1=1.19$.

In the sixth embodiment of the present photographing optical lens assembly, the focal length of the photographing optical lens assembly is f, the focal length of the fifth lens element 650 is f5, and they satisfy the relation:

$f/f5=0.12$.

In the sixth embodiment of the present photographing optical lens assembly, the focal length of the first lens element 610 is f1, the focal length of the third lens element 630 is f3, and they satisfy the relation:

f1/f3=1.08.

In the sixth embodiment of the present photographing optical lens assembly, the distance on the optical axis between the first lens element 610 and the second lens element 620 is T12, the focal length of the photographing optical lens assembly is f, and they satisfy the relation:

(T12/f)*100=5.47.

In the sixth embodiment of the present photographing optical lens assembly, an electronic sensor is disposed at the image plane 670 for image formation. The distance on the optical axis between the aperture stop 600 and the electronic sensor is SL, the distance on the optical axis between the object-side surface 611 of the first lens element 610 and the electronic sensor is TTL, and they satisfy the relation:

SL/TTL=0.86.

In the sixth embodiment of the present photographing optical lens assembly, the distance on the optical axis between the object-side surface 611 of the first lens element 610 and the electronic sensor is TTL, half of the diagonal length of the effective pixel area of the electronic sensor is ImgH, and they satisfy the relation:

TTL/ImgH=1.86.

The detailed optical data of the sixth embodiment is shown in FIG. 23 (TABLE 11), and the aspheric surface data is shown in FIG. 24 (TABLE 12), wherein the units of the radius of curvature, the thickness and the focal length are expressed in mm, and HFOV is half of the maximal field of view.

It is to be noted that TABLES 1-12 (illustrated in FIGS. 13-24 respectively) show different data of the different embodiments, however, the data of the different embodiments are obtained from experiments. Therefore, any photographing optical lens assembly of the same structure is considered to be within the scope of the present invention even if it uses different data. The embodiments depicted above and the appended drawings are exemplary and are not intended to limit the claim scope of the present invention. TABLE 13 (illustrated in FIG. 25) shows the data of the respective embodiments resulting from the equations.

What is claimed is:

1. A photographing optical lens assembly comprising five lens elements with refractive power, in order from an object side to an image side:
   a first lens element with positive refractive power having a convex object-side surface;
   a second lens element with negative refractive power having a concave object-side surface and a concave image-side surface;
   a third lens element with positive refractive power;
   a fourth lens element with negative refractive power having a convex object-side surface and a concave image-side surface, at least one of the object-side and image-side surfaces thereof being aspheric; and
   a fifth lens element having a convex object-side surface and a concave image-side surface on which at least one inflection point is formed, made of plastic;
   wherein the photographing optical lens assembly further comprises an aperture stop disposed between an imaged object and the third lens element, and an electronic sensor for image formation; wherein the first lens element is the lens element with refractive power closest to the object, and there are at most six lens elements with refractive power; and
   wherein a radius of curvature on the image-side surface of the second lens element is R4, a focal length of the photographing optical lens assembly is f, an Abbe number of the first lens element is V1, an Abbe number of the second lens element is V2, a distance on the optical axis between the aperture stop and the electronic sensor is SL, a distance on the optical axis between the object-side surface of the first lens element and the electronic sensor is TTL, and they satisfy the relation:

0.3<R4/f<30.0;

23.0<V1-V2<45.0;

0.65<SL/TTL<1.10.

2. The photographing optical lens assembly according to claim 1, wherein the lens element has a concave object-side surface and a convex image-side surface.

3. The photographing optical lens assembly according to claim 2, wherein the focal length of the photographing optical lens assembly is f, a focal length of the first lens element is f1, and they satisfy the relation:

0.80<f/f1<2.00.

4. The photographing optical lens assembly according to claim 3, wherein the focal length of the photographing optical lens assembly is f, the focal length of the first lens element is f1, and they satisfy the relation:

1.32<f/f1<2.00.

5. The photographing optical lens assembly according to claim 3, wherein there are five lens elements with refractive power in the photographing optical lens assembly.

6. The photographing optical lens assembly according to claim 5, wherein the focal length of the first lens element is f1, a focal length of the third lens element is f3, and they satisfy the relation:

0.25<f1/f3<1.20.

7. The photographing optical lens assembly according to claim 6, wherein a distance on the optical axis between the first and second lens elements is T12, the focal length of the photographing optical lens assembly is f, and they satisfy the relation:

0.5<(T12/f)*100<9.5.

8. The photographing optical lens assembly according to claim 6, wherein the focal length of the photographing optical lens assembly is f, a focal length of the fifth lens element is f5, and they satisfy the relation:

−0.35<f/f5<0.35.

9. The photographing optical lens assembly according to claim 5, wherein the radius of curvature on the image-side surface of the second lens element is R4, the focal length of the photographing optical lens assembly is f, and they satisfy the relation:

0.6<R4/f<2.0.

10. The photographing optical lens assembly according to claim 5, wherein the aperture stop is disposed between the first lens element and the second lens element; wherein the distance on the optical axis between the aperture stop and the electronic sensor is SL, the distance on the optical axis between the object-side surface of the first lens element and the electronic sensor is TTL, and they satisfy the relation:

0.78<SL/TTL<0.93.

11. The photographing optical lens assembly according to claim 10, wherein a thickness on the optical axis of the second lens element is CT2, the focal length of the photographing optical lens assembly is f, and they satisfy the relation:

$$0.3<(CT2/f)*10<1.1.$$

12. The photographing optical lens assembly according to claim 5, wherein the fifth lens element has refractive power.

13. The photographing optical lens assembly according to claim 2, wherein the Abbe number of the first lens element is V1, the Abbe number of the second lens element is V2, and they satisfy the relation:

$$31.0<V1-V2<42.0.$$

14. The photographing optical lens assembly according to claim 2, wherein the distance on the optical axis between the first and second lens elements is T12, the focal length of the photographing optical lens assembly is f, and they satisfy the relation:

$$0.5<(T12/f)*100<5.5.$$

15. The photographing optical lens assembly according to claim 2, wherein the distance on the optical axis between the object-side surface of the first lens element and the electronic sensor is TTL, half of the diagonal length of the effective pixel area of the electronic sensor is ImgH, and they satisfy the relation:

$$TTL/ImgH<1.95.$$

16. A photographing optical lens assembly comprising, in order from an object side to an image side:
- a first lens element with positive refractive power having a convex object-side surface;
- a second lens element with negative refractive power having a concave object-side surface and a concave image-side surface;
- a third lens element with positive refractive power having a concave object-side surface and a convex image-side surface;
- a fourth lens element with negative refractive power, at least one of the object-side and image-side surfaces thereof being aspheric; and
- a fifth lens element having a convex object-side surface and a concave image-side surface, the object-side and image-side surfaces thereof being aspheric; and
- wherein the photographing optical lens assembly further comprises an aperture stop, disposed between an imaged object and the third lens element, and an electronic sensor for image formation; wherein there are five lens elements with refractive power;
- wherein a radius of curvature on the image-side surface of the second lens element is R4, a focal length of the photographing optical lens assembly is f, a distance on the optical axis between the first and second lens elements is T12, a distance on the optical axis between the aperture stop and the electronic sensor is SL, a distance on the optical axis between the object-side surface of the first lens element and the electronic sensor is TTL, and they satisfy the relation:

$$0.3<R4/f<30.0;$$
$$0.5<(T12/f)*100<15.0;$$
$$0.65<SL/TTL<1.10.$$

17. The photographing optical lens assembly according to claim 16, wherein the fourth lens element has a convex object-side surface and a concave image-side surface.

18. The photographing optical lens assembly according to claim 17, wherein there is at least one inflection point formed on the image-side surface of the fifth lens element, which is made of plastic.

19. The photographing optical lens assembly according to claim 18, wherein the radius of curvature of the image-side surface of the second lens element is R4, the focal length of the photographing optical lens assembly is f, and they satisfy the relation:

$$0.5<R4/f<10.0.$$

20. The photographing optical lens assembly according to claim 19, wherein the aperture stop is disposed between the first and second lens elements, the distance on the optical axis between the aperture stop and the electronic sensor is SL, the distance on the optical axis between the object-side surface of the first lens element and the electronic sensor is TTL, and they satisfy the relation:

$$0.78<SL/TTL<0.93.$$

21. The photographing optical lens assembly according to claim 18, wherein the distance on the optical axis between the first and second lens elements is T12, the focal length of the photographing optical lens assembly is f, and they satisfy the relation:

$$0.5<(T12/f)*100<9.5.$$

22. The photographing optical lens assembly according to claim 21, wherein an Abbe number of the first lens element is V1, an Abbe number of the second lens element is V2, and they satisfy the relation:

$$31.0<V1-V2<42.0.$$

23. The photographing optical lens assembly according to claim 18, wherein the focal length of the photographing optical lens assembly is f, the focal length of the first lens element is f1, and they satisfy the relation:

$$1.32<f/f1<2.00.$$

24. The photographing optical lens assembly according to claim 23, wherein the focal length of the photographing optical lens assembly is f, a focal length of the fifth lens element is f5, and they satisfy the relation:

$$-0.35<f/f5<0.35.$$

25. The photographing optical lens assembly according to claim 18, wherein an Abbe number of the third lens element is V3, an Abbe number of the fourth lens element is V4, and they satisfy the relation:

$$23.0<V3-V4<45.0.$$

* * * * *